(12) United States Patent
Inagaki et al.

(10) Patent No.: US 6,618,220 B2
(45) Date of Patent: Sep. 9, 2003

(54) HEAD ACTUATOR AND HARD DISC DRIVE INCLUDING THE SAME

(75) Inventors: Tatsuhiko Inagaki, Osaka (JP); Hideki Kuwajima, Kyoto (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/894,871

(22) Filed: Jun. 28, 2001

(65) Prior Publication Data

US 2002/0012194 A1 Jan. 31, 2002

(30) Foreign Application Priority Data

Jul. 4, 2000 (JP) .......................... 2000-202981

(51) Int. Cl.[7] .................... G11B 5/596; G11B 21/24
(52) U.S. Cl. ................. 360/78.05; 360/77.02; 360/294.4; 360/294.1
(58) Field of Search ................. 360/294, 294.1, 360/294.2, 294.3, 294.4, 294.5, 294.6, 244.3, 75, 76, 77.02, 78.04, 78.05, 78.12

(56) References Cited

U.S. PATENT DOCUMENTS

| | | | |
|---|---|---|---|
| 5,521,778 A | 5/1996 | Boutaghou et al. | 360/264.5 |
| 5,764,444 A | 6/1998 | Imamura et al. | 360/294.4 |
| 5,796,558 A | 8/1998 | Hanrahan et al. | 360/294.6 |
| 5,898,541 A | 4/1999 | Boutaghou et al. | 360/294.4 |
| 5,936,805 A | 8/1999 | Imaino | 360/294.5 |
| 6,002,549 A | 12/1999 | Berman et al. | 360/294.4 |
| 6,034,834 A * | 3/2000 | Yoshikawa et al. | 360/75 |
| 6,069,771 A | 5/2000 | Boutaghou et al. | 360/294.4 |
| 6,078,473 A | 6/2000 | Crane et al. | 360/294.3 |
| 6,532,138 B1 * | 3/2003 | Koganezawa | 360/294.4 |
| 6,538,854 B2 * | 3/2003 | Koganezawa et al. | 360/294.4 |

FOREIGN PATENT DOCUMENTS

| | | |
|---|---|---|
| JP | 9-259550 | 10/1997 |
| JP | 11-242864 | 9/1999 |
| JP | 2000-100097 | 4/2000 |
| JP | 2000-260140 | 9/2000 |

* cited by examiner

*Primary Examiner*—Andrew L. Sniezek
(74) *Attorney, Agent, or Firm*—Renner, Otto, Boisselle & Sklar

(57) ABSTRACT

A head actuator includes a head slider for carrying a head for recording information to or reproducing information from a recording medium; and a head supporting member for supporting the head slider. The head supporting member includes a substrate and a driving element provided on at least one surface of the substrate for generating an expanding and contracting force in a longitudinal direction in accordance with an external signal, wherein the external signal is applied to the driving element so as to expand or contract the head supporting member in the longitudinal direction and to position the head in a radial direction of the recording medium. The head supporting member includes a first area on which the head slider is provided, a second area on which the driving element is provided, and a third area for connecting the first area and the second area. The driving element has a geometrically central face. The head supporting member has a first neutral face in the second area and a second neutral face in the third area. The second neutral face is on the same side as the geometrically central face with respect to the first neutral face.

31 Claims, 17 Drawing Sheets

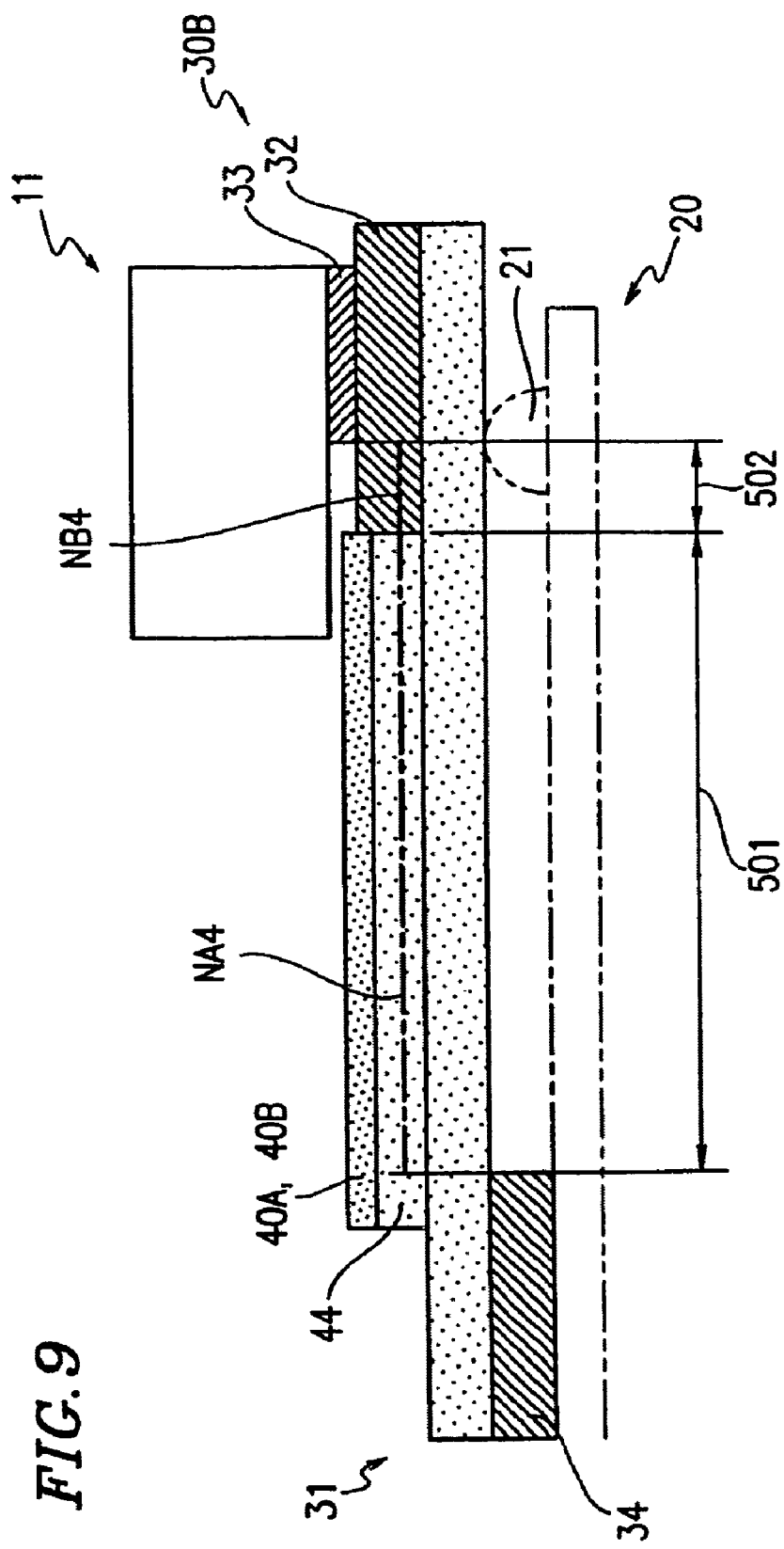

(a)
(b)
(c)

HEAD ACTUATOR AND HARD DISC DRIVE INCLUDING THE SAME

BACKGROUND OF THE INVENTION

1. Field of the Invention

The present invention relates to a head actuator, used in an information recording and reproduction apparatus, for positioning a head on a desired track of an information medium, and a hard disc drive including the same.

2. Description of the Related Art

Recently, recording and reproduction apparatuses using a circular information medium, such as, for example, a magnetic disc apparatus and an optical disc apparatus have been widely used. Among these apparatuses, a magnetic disc apparatus is especially widely used as an external memory apparatus for a personal computer with its characteristic of transferring data at a high speed being utilized.

One small-size magnetic disc apparatus commonly used in recent years uses a magnetic disc having concentric recording tracks and performs information recording and reproduction by positioning a magnetic head on a desired recording track position of the magnetic disc by a swingable head actuator. In order to further improve the recording density, a system for improving the head positioning precision by providing a secondary small head actuator at a tip of the swingable head actuator has been proposed. Several types of small head actuators used for this system have also been proposed.

One exemplary small head actuator is disclosed in Japanese Laid-Open Publication No. 5-47126, which has the following structure. A head supporting spring is formed of two beams. The two beams are connected together at tips thereof, and a head is supported in the vicinity of the connection point. At least one of the beams integrally has a thin film-like displacement element bonded on at least one surface thereof. The displacement element is expandable in accordance with the level of a voltage externally applied. (This type of small head actuator will be referred to as "conventional example 1").

Another exemplary small head actuator is disclosed in Japanese Laid-Open Publication No. 7-224838. In the actuator disclosed in this publication, a piezoelectric element is provided on a surface of a load beam on which a head is to be mounted. (This type of small head actuator will be referred to as "conventional example 2").

Conventional examples 1 and 2 are common in the basic structure. These examples will be described below.

FIG. 15 schematically shows a structure of a conventional head actuator 1200 (corresponding to conventional example 1). As shown in FIG. 15, a head supporting member 50 has a head slider 52 bonded at one end thereof. The head supporting member 50 also has a late-like displacement element 51 bonded to a surface near the center thereof.

As shown in FIG. 15, an area of the head supporting member 50 provided with the displacement element 51 is defined as an area 1201, and areas of the head supporting member 50 where the displacement element 51 is not provided is defined as areas 1202.

In this specification, the term "neutral face" is defined to indicate a face which is not expanded or contracted when a beat is bent.

Referring to FIG. 15, a neutral face NB1 of the areas 1202 matches a geometrically central face of the head supporting member 50. In the area 1201, the displacement element 51 is integrally bonded to the head supporting member 50. Therefore, a neutral face NA1 of the area 1201 is inevitably closer to the displacement element 51 than the neutral face NB1. (Hereinafter, a distance D1 between the neutral faces NA1 and NB1 will be referred to as a "neutral face step". Corresponding distances in the following examples each will also be referred to as the "neutral face step".) A geometrically central face L1 (also referred to simply as the "central face L1") of the displacement element 51 is on the opposite side to the neutral face NB1 with respect to the neutral face NA1. A distance between the central face L1 and the neutral face NA1 is defined as H1.

When a voltage is applied to the displacement element 51, the head supporting member 50 expands or contracts in longitudinal directions relative to the head supporting member 50, and thus the head slider 52 is slightly displaced in a radial direction of a magnetic disc.

In general, two basic performance requirements of a small head actuator are (i) a sufficiently large displacement amount at a lower voltage and (ii) a sufficiently high mechanical resonance frequency so as to realize positioning control in a wide range of band.

The conventional head actuator 1200 has the following two problems. The displacement generated by the expansion and contraction in the longitudinal directions of the head supporting member 50 caused by the voltage application to the displacement element 51 is lost by a flexure of the head supporting member 50, and thus an effective displacement is not obtained. The mechanical resonance frequency mainly relies on the rigidity in flexure directions of the head supporting member 50, and thus it is difficult to obtain a resonance frequency in a wider band range.

First, the problem regarding the displacement will be described.

FIG. 16 shows a static model of the conventional head actuator 1200 (FIG. 15). From the viewpoint of statics, the head actuator 1200 can be represented as a model shown in part (a) of FIG. 16. In part (a) of FIG. 16, the head supporting member 50 is represented by the neutral faces NA1 and NB1. A force provided by the displacement element 51 acts on the head supporting member 50 as an external force.

Now, it is assumed that a voltage is applied to the displacement element 51 in such a direction as to expand the displacement element 51. An expanding force F1 acts outward as shown in part (a) of FIG. 16. Since the central face L1 of the displacement element 51 is on the opposite side to the neutral face NB1 with respect to the neutral face NA1 as described above, a bending moment M1 is generated by the expanding force F1. The bending moment M1 has a magnitude obtained by multiplying the expandable force F1 by the distance H1. On the sheet of FIG. 15, the central face L1 is above the neutral face NA1 by the distance H1. Thus, the bending moment M1 acts in such a direction to cause the neutral face NA1 to project upward on the sheet of FIG. 15. This state is considered to be obtained by the combination of (i) a state of only the expanding force F1 being applied (part (b) of FIG. 16) and (ii) a state of only the bending moment M1 being applied (part (C) of FIG. 16). Considering a length of the area 1201, i.e., the distance between point A and point B, as shown in part (b) of FIG. 16, point A is displaced in such a longitudinal direction as to expand the displacement element 51 by a displacement amount X1. When, as shown in part (c) of FIG. 16, the bending moment M1 is applied in such a direction to cause the neutral face NA1 to project upward, the bending moment M1 generates flexure angles θA and θB at two ends of the displacement element 51. At each of the flexure angles θA and θB, a displacement amount in a longitudinal direction which is obtained by multiplying each of the flexure angles θA and θB by the neutral face step D1 is generated. Thus, points A is displaced in such a longitudinal direction as to contract the displacement element 51 by a displacement amount X2. As is clear from parts (a) and (b) of FIG. 16, the displacement amounts X1 and X2 are in opposite directions. A difference therebetween is a total displacement amount.

When a voltage is applied in such a direction as to contract the displacement element 51, the displacement amounts X1 and X2 are in opposite directions, and a difference therebetween is a total displacement amount. Accordingly, with the structure of the conventional head actuator 1200, the displacement amount X1 generated by the expanding force in one longitudinal direction is lost by the displacement amount X2 generated in the opposite longitudinal direction by the flexure angles. Therefore, a sufficient amount of displacement for positioning the head is not provided.

Next, the problem regarding the mechanical resonance frequency will be described.

FIG. 17 shows a kinetic model of the conventional head actuator 1200 (FIG. 15). The head supporting member 50 can be represented as a model in which an equivalent mass MA1 is concentrated at the center of a beam 1401 (corresponding to the head supporting member 50) having an equivalent flexural rigidity. In FIG. 16, K1 represents an equivalent rigidity in expanding and contracting directions of the head supporting member 50, and MS represents an equivalent mass of a movable body 1402 having the head slider 52 at the center. In this kinetic model, a natural vibration mode is formed by coupling a degree of freedom φS of the movable body 1402 and a degree of freedom φY of the beam 1401 in flexure directions. Namely, an inertial force generated by the vibration of the mass MS in a φS direction acts on the beam 1401 as a moment M1S due to the neutral face step D1. In the state where the inertial force generated by the vibration of the mass MS of the movable body 1402 in the φS direction is kinetically balanced with an inertial force generated by the vibration of the equivalent mass MA1 of the beam 1401 in a φY direction, the natural vibration mode is formed. The natural frequency of the natural vibration mode is determined by the inertial force generated by the mass MS of the movable body 1402 and an elastic force of the beam 1401 (i.e., the head supporting member 50) in flexure directions. Accordingly, in order to increase the natural frequency, the rigidity of the head supporting member 50 needs to be increased.

However, an increase in the rigidity of the head supporting member 50 increases the resistance against the expanding force of the displacement element 51, which decreases the displacement amount. Conversely, an attempt to guarantee a prescribed displacement amount undesirably results in a decrease in the natural frequency, i.e., mechanical resonance frequency. The displacement amount and the mechanical resonance frequency cannot be satisfied at the same time.

SUMMARY OF THE INVENTION

According to one aspect of the invention, a head actuator includes a head slider for carrying a head for recording information to or reproducing information from a recording medium; and a head supporting member for supporting the head slider. The head supporting member includes a substrate and a driving element provided on at least one surface of the substrate for generating an expanding and contracting force in a longitudinal direction in accordance with an external signal, wherein the external signal is applied to the driving element so as to expand or contract the head supporting member in the longitudinal direction and to position the head in a radial direction of the recording medium. The head supporting member includes a first area on which the head slider is provided, a second area on which the driving element is provided, and a third area for connecting the first area and the second area. The driving element has a geometrically central face. The head supporting member has a first neutral face in the second area and a second neutral face in the third area. The second neutral face is on the same side as the geometrically central face with respect to the first neutral face.

In one embodiment of the invention, the first neutral face is closer to the substrate than the geometrically central faces In one embodiment of the invention, the head supporting member further includes a neutral face displacing section for displacing the second neutral face so as to be on the same side as the geometrically central face with respect to the first neutral face.

In one embodiment of the invention, the neutral face displacing section includes a reinforcing member provided in at least the third area.

In one embodiment of the invention, the first neutral face is an the opposite side to the substrate with respect to the geometrically central face.

In one embodiment of the invention, the head supporting member further includes a geometrically central face displacing section for displacing the first neutral face so as to be on the opposite side to the substrate with respect to the geometrically central face.

In one embodiment of the invention, the geometrically central face displacing section includes a holding member provided on the same side as the substrate with respect to the driving element. The holding member has a function of increasing a rigidity of the head supporting member in a flexure direction and increasing a natural frequency of the head supporting member.

In one embodiment of the invention, the holding member includes a low rigidity layer provided on the driving element and having a smaller longitudinal elastic coefficient than that of the driving element, and a high rigidity layer provided on the low rigidity layer and having a larger longitudinal elastic coefficient than that of the low rigidity layer.

In one embodiment of the invention, the low rigidity layer includes a polyimide resin, and the high rigidity layer includes stainless steel.

In one embodiment of the invention, the head supporting member further includes a first neutral face displacing section for displacing the second neutral face so as to be on the same side as the geometrically central face with respect to the first neutral face.

In one embodiment of the invention, the first neutral face displacing section includes a reinforcing member provided in at least the third area.

In one embodiment of the invention, the reinforcing member is provided on the opposite side to the driving element with respect to the substrate.

In one embodiment of the invention, the driving element has a first elongation rigidity. The substrate has a second elongation rigidity. The first elongation rigidity is larger than the second elongation rigidity.

In one embodiment of the invention, the driving element has a plate-like shape.

In one embodiment of the invention, the driving element includes a piezoelectric element unit including a thin film piezoelectric body and an electrode provided on the thin film piezoelectric body.

In one embodiment of the invention, the driving element includes a first driving element and a second driving element which are supplied with voltages in opposite directions to each other.

In one embodiment of the invention, the substrate includes a first expansion and contraction section having the first driving element provided thereon, a second expansion and contraction section having the second driving element provided thereon, a pivoting section having the head slider provided thereon, a first hinge section for connecting the pivoting section and the first expansion and contraction section, and a second hinge section for connecting the pivoting section and the second expansion and contraction section.

In one embodiment of the invention, the head actuator further includes a load beam for supporting the head supporting member.

According to another aspect of the invention, a head actuator includes a head slider for carrying a head for recording information to or reproducing information from a recording medium; and a head supporting member for supporting the head slider. The head supporting member includes a substrate and a driving element provided on at least one surface of the substrate for generating an expanding and contracting force in a longitudinal direction in accordance with an external signal, wherein the external signal is applied to the driving element so as to expand or contract the head supporting member in the longitudinal direction and to position the head in a radial direction of the recording medium. The head supporting member includes a first area on which the head slider is provided, a second area on which the driving element is provided, and a third area for connecting the first area and the second area. The head supporting member has a first neutral face In the second area and a second neutral face in the third area. The first neutral face and the second neutral face are substantially continuous to each other.

In one embodiment of the invention, the head supporting member includes a continuation section for causing the first neutral face and the second neutral face to be substantially continuous to each other.

In one embodiment of the invention, the continuation section includes an intermediate layer provided between the substrate and the driving element.

In one embodiment of the invention, the continuation section includes a reinforcing member provided in at least the third area.

In one embodiment of the invention, the continuation section includes a line section provided in the vicinity of the driving element.

In one embodiment of the invention, the driving element has a first elongation rigidity. The substrate has a second elongation rigidity. The first elongation rigidity is larger than the second elongation rigidity.

In one embodiment of the invention, the driving element has a plate-like shape.

In one embodiment of the invention, the driving element includes a piezoelectric element unit including a thin film piezoelectric body and an electrode provided on the thin film piezoelectric body.

In one embodiment of the invention, the driving element includes a first driving element and a second driving element which are supplied with voltages in opposite directions to each other.

In one embodiment of the invention, the substrate includes a first expansion and contraction section having the first driving element provided thereon, a second expansion and contraction section having the second driving element provided thereon, a pivoting section having the head slider provided thereon, a first hinge section for connecting the pivoting section and the first expansion and contraction section, and a second hinge section for connecting the pivoting section and the second expansion and contraction section.

In one embodiment of the invention, the head actuator further includes a load beam for supporting the head supporting member.

According to still another aspect of the invention, a hard disc drive includes the above-described head actuator; a motor for rotating the recording medium; a driving section for moving the head actuator across a surf ace of the recording medium in a radial direction of the recording medium so as to allow the head to access a prescribed data track on the recording medium; and a control section for supplying the driving element with an external signal so as to expand or contract the head supporting member in a longitudinal direction and position the head in the radial direction of the recording medium.

Thus, the invention described herein makes possible the advantages of providing a head actuator for offering a larger amount of displacement of a head of an information recording and reproduction apparatus at a lower voltage and also realizing a higher mechanical resonance frequency so as to improve the precision of the head positioning control.

These and other advantages of the present invention will become apparent to those skilled in the art upon reading and understanding the following detailed description with reference to the accompanying figures.

BRIEF DESCRIPTION OF THE DRAWINGS

FIG. 9 is a partial schematic cross-sectional view of a head actuator according to a third example of the present invention;

DESCRIPTION OF THE PREFERRED EMBODIMENTS

Hereinafter, the present invention will be described by way of illustrative examples with reference to the accompanying drawings. Examples of a head actuator used in a magnetic disc apparatus will be described with reference to FIGS. 1 through 14 as preferred embodiments according to the present invention.

EXAMPLE 1

A head actuator 100 according to a first example of the present invention will be described with reference to FIGS. 1 through 5.

Figure 1:
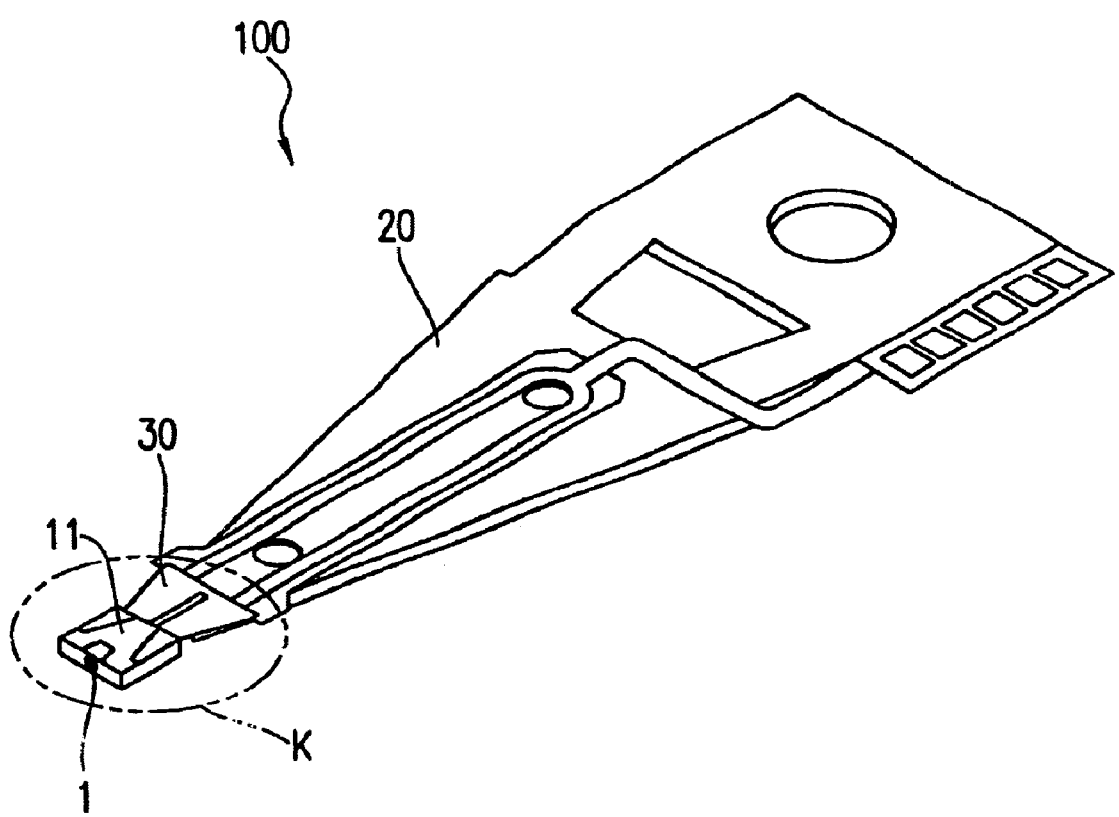
FIG. 1 is a partial isometric view of a head actuator according to a first example of the present invention.

FIG. 1 is a partial isometric view of the head actuator 100 according to the first example. The head actuator 100 includes a head slider 11 having a magnetic head 1 provided on one end surface thereof for recording information to or reproducing information from a recording medium (not shown), a flexure member 30 having the head slider 11 banded at an end thereof, and a load beam 20 for supporting the flexure member 30. As the head slider 11 and the load beam 20, those which are commonly used today in a general magnetic disc apparatus can be used.

Figure 2:
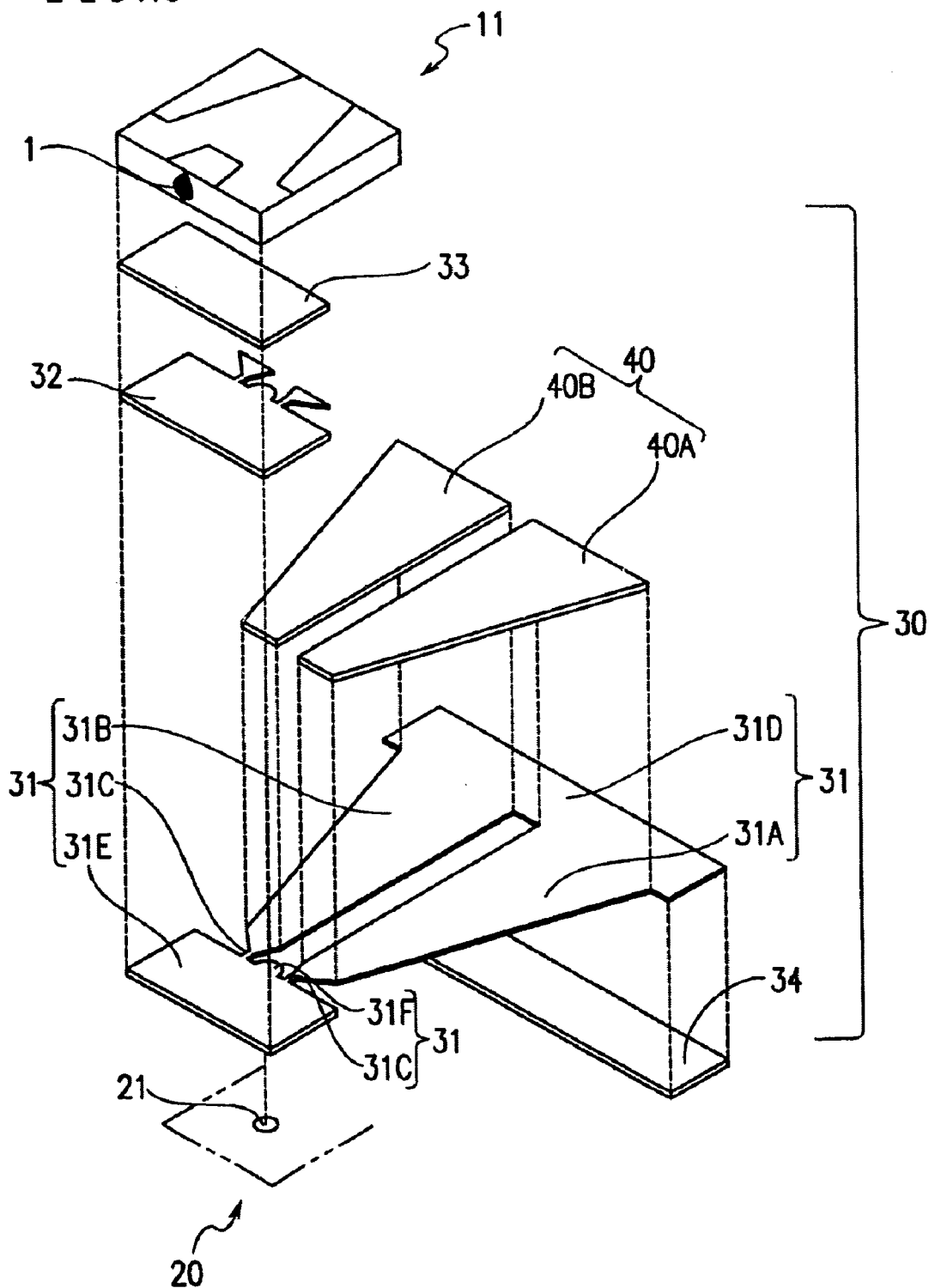
FIG. 2 is an exploded isometric view of a portion in FIG. 1 surrounded by circle K.
Figure 3:
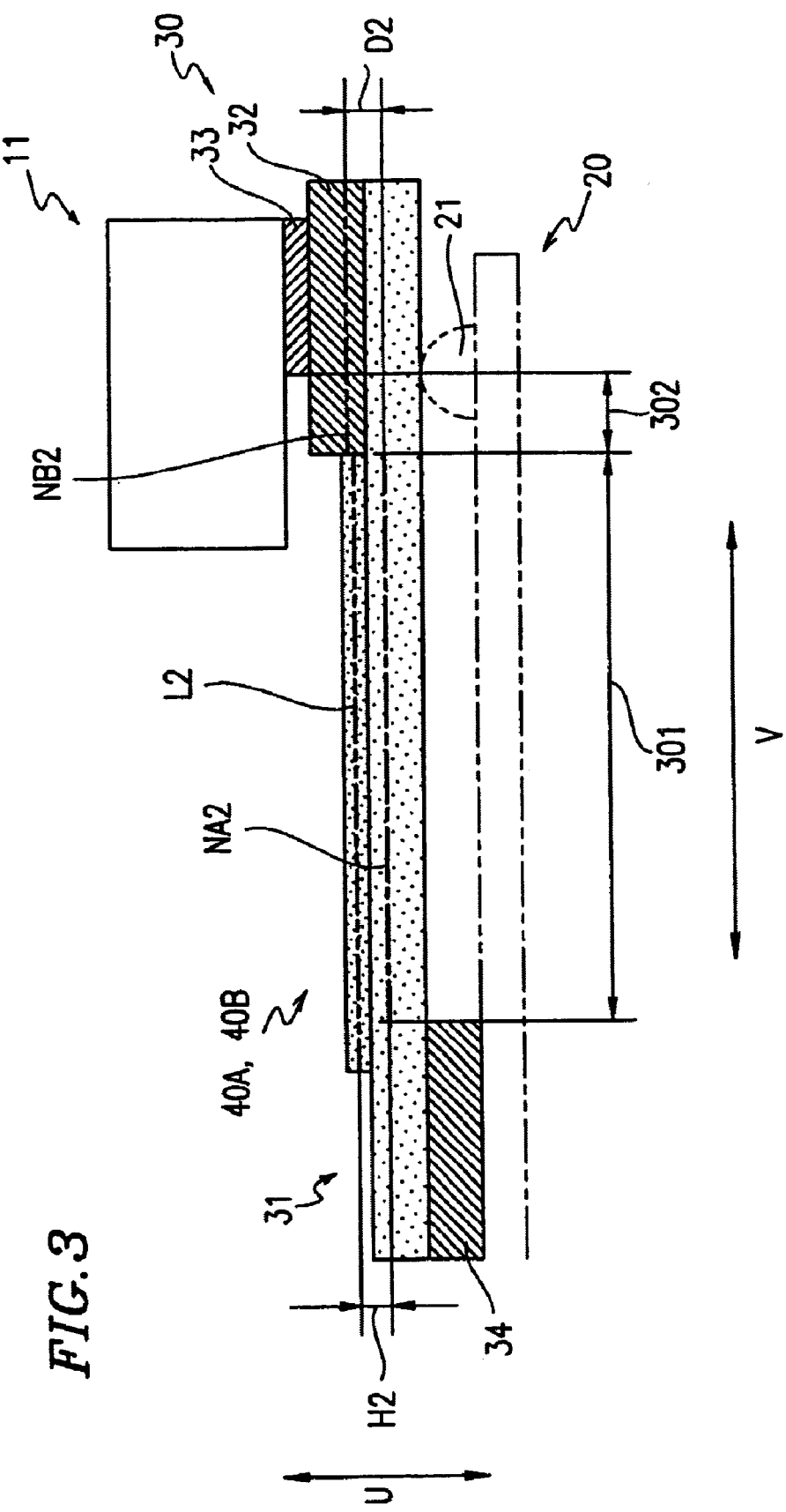
FIG. 3 is a cross-sectional view of a flexure member of the head actuator in the first example.
Figure 4:
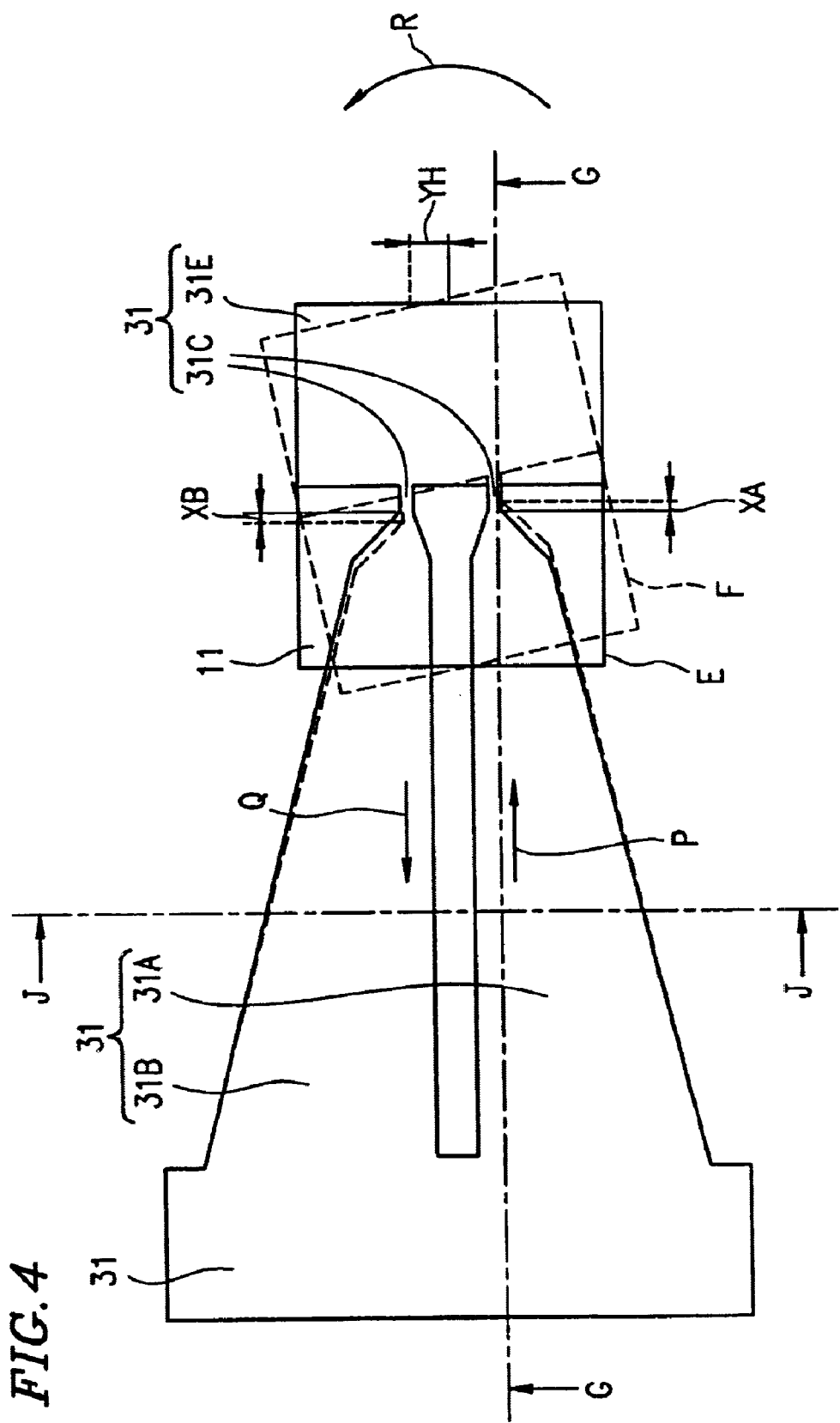
FIG. 4 is a plan view of the flexure member of the head actuator in the first example, illustrating how the flexure member is deformed.

FIG. 2 is an exploded isometric view of a portion in FIG. 1 surrounded by circle K. FIG. 4 is a plan view of the flexure member 30 shown in FIG. 1. FIG. 3 is a schematic cross-sectional view of the flexure member 30 shown in FIG. 4 taken long line G—G. In FIG. 3, the flexure member 30 is shown with a size in thickness directions being enlarged with respect to a size in longitudinal directions of the flexure member 30.

Throughout this specification, the directions shown by two-headed arrow V in FIG. 3 and corresponding directions in the other figures are referred to as the "longitudinal directions". The flexure members according to the present invention extend in the "longitudinal directions". The directions shown by two-headed arrow U in FIG. 3 and corresponding directions in the other figures are referred to as the "thickness directions". The term "flexure directions" is defined to indicate directions substantially the same as the "thickness directions". The "thickness directions" and the "flexure directions" are substantially perpendicular to the "longitudinal directions".

As shown in FIGS. 2 and 3, the flexure member 30 includes a flexible substrate 31, a piezoelectric element unit 40, a reinforcing plate 32, a spacer 33 and a back plate 34. The flexible substrate 31 and a piezoelectric element unit 40 are included in a head supporting member.

The piezoelectric element unit 40 includes a first piezoelectric element unit 40A and a second piezoelectric element unit 40B. The flexible substrate 31 includes a fixed portion 31D and two beam-like expandable portions 31A and 31B extending from the fixed portion 31D. The expandable portions 31A and 31B are connected to a pivoting portion 31E through hinge portions 31C. The flexible substrate 31 is formed of a polyimide resin base plate having a thickness of about 10 $\mu$m and a wiring pattern formed on the base plate. The pivoting portion 31E and the hinge portions 31C of the flexible substrate 31 are provided with the reinforcing plate 32 bonded thereto. The reinforcing plate 32 has a thickness of about 25 $\mu$m and has a planar shape similar to that of a portion including the pivoting portion 31E and the hinge portions 31C. The reinforcing plate 32 is formed of stainless steel. The head slider 11 is bonded to the reinforcing plate 32 with the spacer 33 interposed therebetween.

The expandable portions 31A and 31B are respectively bonded to the first piezoelectric element unit 40A and the second piezoelectric element unit 40B. The first piezoelectric element unit 40A and the second piezoelectric element unit 40B each include a PZT (lead zirconate titanate) thin film piezoelectric body having a thickness of about 2.5 $\mu$m and a platinum electrode having a thickness of about 0.1 $\mu$m formed on each of two surfaces thereof. In accordance with the level of a voltage applied to the platinum electrodes, the piezoelectric element units 40A and 40B expand or contract in longitudinal directions. The platinum electrodes are bonded to a wire of the flexible substrate 31 and are supplied with a voltage by an external driver (not shown). The back plate 34 is bonded to a rear surface of the fixed portion 31D which is on the opposite side to surfaces of the expandable portions 31A and 31B bonded to the piezoelectric element units 40A and 40B. The back plate 34 is formed of stainless steel, and as joined to the load beam 20 (FIG. 1) by spot welding. The pivoting portions 31E of the flexible substrate 31 have a dimple receiver 31F therebetween. A dimple 21 of the load beam 20 is in contact with a rear surface of the dimple receiver 31F, thus forming a pivoting bearing.

In FIG. 3, an area of the flexible substrate 31 including the expandable portions 31A and 31B is defined as an area 301, and an area including the hinge portions 31C is defined as an area 302. The flexible substrate 31 and the piezoelectric element unit 40 interpose therebetween a very thin adhesive layer (not shown) for bonding the flexible substrate 31 and the piezoelectric element unit 40. A logical product of a longitudinal elastic coefficient and a cross-sectional area of the piezoelectric body formed of PZT of the piezoelectric element unit 40 is about 1.5 times a value obtained by adding a logical product of a longitudinal elastic coefficient and a cross-sectional area of the flexible substrate 31 and a logical product of a longitudinal elastic coefficient and a cross-sectional area of the adhesive layer.

In FIG. 3, a neutral face NA2 of the flexure member 30 in the area 301 is inside the flexible substrate 31, and a neutral face NB2 of the flexure member 30 in the area 302 is inside the reinforcing plate 32. A neutral face step D2 between the neutral faces NA2 and NB2 is about 16 $\mu$m. A geometrically central face L2 (also referred to simply as the "central face L2") of the piezoelectric element unit 40 is on the same side as the neutral face NB2 with respect to the neutral face NA2. A distance H2 between the central face L2 and the neutral face NA2 is about 7 $\mu$m. The term "geometrically central face" is defined to indicate a face which acts as a geometrical center in a cross-section of, in this example, the piezoelectric element unit 40.

The head actuator 100 having the above-described structure operates as follows.

FIG. 4 is a plan view illustrating deformation of the head actuator 100. In FIG. 4, solid line box E shows the head slider 11 in a non-operating state, and dashed line box F shows the head slider 11 in an operating state. In order to place the head actuator 100 into an operating state, voltages having an equal absolute value and acting in opposite directions are respectively applied to the piezoelectric element units 40A and 40B (FIG. 2) by a driver. When, for example, the first piezoelectric element unit 40A is supplied with a voltage in such a direction as to contract the first piezoelectric element unit 40A and the second piezoelectric element unit 40B is supplied with a voltage in such a direction as to expand the second piezoelectric element unit 40B, the head actuator 100 operates as follows. The expandable portion 31A of the flexible substrate 31 is deformed in a direction shown by arrow P, and the expandable portion 31B is deformed in the direction shown by arrow Q. At the hinge portions 31C, displacement amounts in longitudinal directions of the head actuator 100, i.e., a displacement amount XA and a displacement amount XB, are generated. The displacement amounts XA and XB have an equal absolute value and are in opposite directions. Accordingly, at the pivoting portion 31E, a rotation in a direction of arrow R is generated with a mid point between the hinge portions 31C as the fulcrum. At the position of a magnetic head of the magnetic disc apparatus, the head slider 11 is displaced by YH in directions substantially perpendicular to arrows P and Q. The displacement amount YH of the position of the magnetic head is in proportion to the expanding or contracting amount of the expandable portions 31A and 31B, and thus is in proportion to the voltage applied to the piezoelectric element units 40A and 40B. When the proportion constant between the applied voltage and the displacement amount of the magnetic head is specified, the position of the magnetic head is controlled by adjusting the level of the voltage supplied from the driver.

In the first example, a piezoelectric distortion generated in the piezoelectric element unit 40 is efficiently converted into a displacement amount in the longitudinal directions as follows. As shown in FIG. 3, the piezoelectric element unit 40 in the area 301 is supported only by the flexible substrate 31 which is sufficiently more flexible than the piezoelectric element unit 40, so that a logical product of a longitudinal elastic coefficient and a cross-sectional area of the piezoelectric body formed of PZT of the piezoelectric element unit 40 is larger than a value obtained by adding a logical product of a longitudinal elastic coefficient and a cross-sectional area of the flexible substrate 31 and a logical product of a longitudinal elastic coefficient and a cross-sectional area of the adhesive layer, as described above. In general, the elongation rigidity of a material is determined by a logical product of a longitudinal elastic coefficient and a cross-sectional area thereof. In the first example, the elongation rigidity of a portion which is against the expanding or contracting force (i.e. the flexible substrate 31 and the adhesive layer) is made smaller than the elongation rigidity of the piezoelectric body formed of PZT of the piezoelectric element unit 40 generating the expanding or contracting force. In this manner, the piezoelectric distortion generated in the piezoelectric body is mostly converted into a displacement amount in the longitudinal directions. Thus, the input voltage is converted into a displacement amount in the longitudinal directions at a satisfactory efficiency. Therefore, a larger displacement amount can be provided at a lower voltage.

Figure 5:
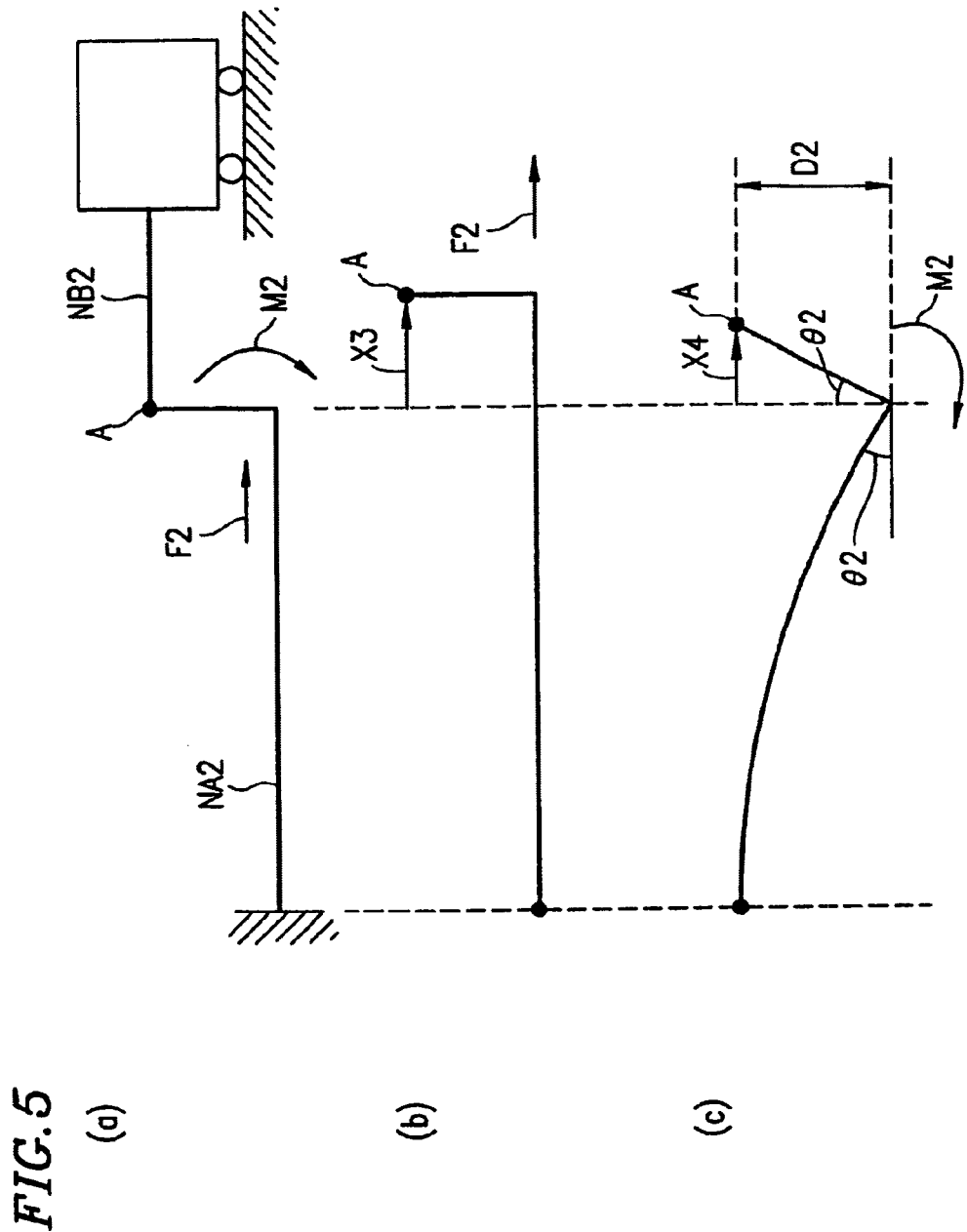
FIG. 5 shows a static model of the head actuator in the first example.

Hereinafter, how the displacement amount in the longitudinal directions is increased in the first example will be described. FIG. 5 shows a static model of the head actuator 100 according to the first example. From the viewpoint of statics, the head actuator 100 can be represented as a model shown in part (a) of FIG. 5. In part (a) of FIG. 5, the flexure member 30 is represented by the neutral faces NA2 and NB2. A force generated by the piezoelectric element unit 40 acts on the flexure member 30 as an external force.

Now, it is assumed that a voltage is applied to the piezoelectric element unit 40 in such a direction as to expand the piezoelectric element unit 40. An expanding force F2 provided by the piezoelectric element unit 40 acts in a contracting direction as shown part (a) of FIG. 5. Since the central face L2 of the piezoelectric element unit 40 is above the neutral face NA2 by the distance H2 as shown in FIG. 3, a bending moment M2 is generated by the expanding force F2. The bending moment M2 has a magnitude obtained by multiplying the expandable force F2 by the distance H2.

Since the central face L2 of the piezoelectric element unit 40 is above the neutral face NA2, the bending moment M2 acts in such a direction as to cause the neutral face NA2 to project downward on the sheet of FIG. 3. This state is considered to be obtained by the combination of (i) a state of only the expanding force F2 being applied (part (b) of FIG. 5) and (ii) a state of only the bending moment M2 being applied (part (a) of FIG. 5). Point A is displaced in a longitudinal direction by a displacement amount X3 by the expanding force F2. As shown in part (c) of FIG. 5, the bending moment M2 generates a flexure angle θ2 at an end of the piezoelectric element unit 40. As a result, a displacement amount which is a logical product of the flexure angle θ2 and the neutral face step D2 is generated in the longitudinal direction. Namely, point A is displaced by a displacement amount X4 in the longitudinal direction. The displacement amount X3 and the displacement amount X4 are in the same direction. Therefore, a sum of the displacement amounts X3 and X4 is a total displacement amount.

When a voltage is applied in such a direction as to contract the piezoelectric element unit 40, the displacement amounts X3 and X4 are in the same directions, and a sum of the displacement amounts X3 and X4 is a total displacement amount.

In the first example, the displacement amount X3 in the longitudinal direction is in the order of $10^{-7}$ m. The flexure angle θ2 is in the order of $10^{-2}$ radian, and the distance D2 is in the order of $10^{-5}$ m. The displacement amount X4, which is the logical product of the flexure angle θ2 and the distance D2, is in the order of $10^{-7}$ m. The displacement amount X3, which is the original displacement amount of the piezoelectric element unit 40, is added together with the displacement amount X4 generated by the flexure angle θ2. Therefore, the actual displacement amount can be increased.

In order to cause the displacement amount X3 of the piezoelectric element unit 40 and the displacement amount X4 generated by the flexure angle θ2 to be in the same direction as in the first example, the neutral face NB2 of the flexure member 30 in the area 302 and the central face L2 of the piezoelectric element unit 40 in the area 301 should be on the same side with respect to the neutral face NA2 of the piezoelectric element unit 40 in the area 301. Such a condition will be referred to as the "displacement addition condition".

Figure 15:
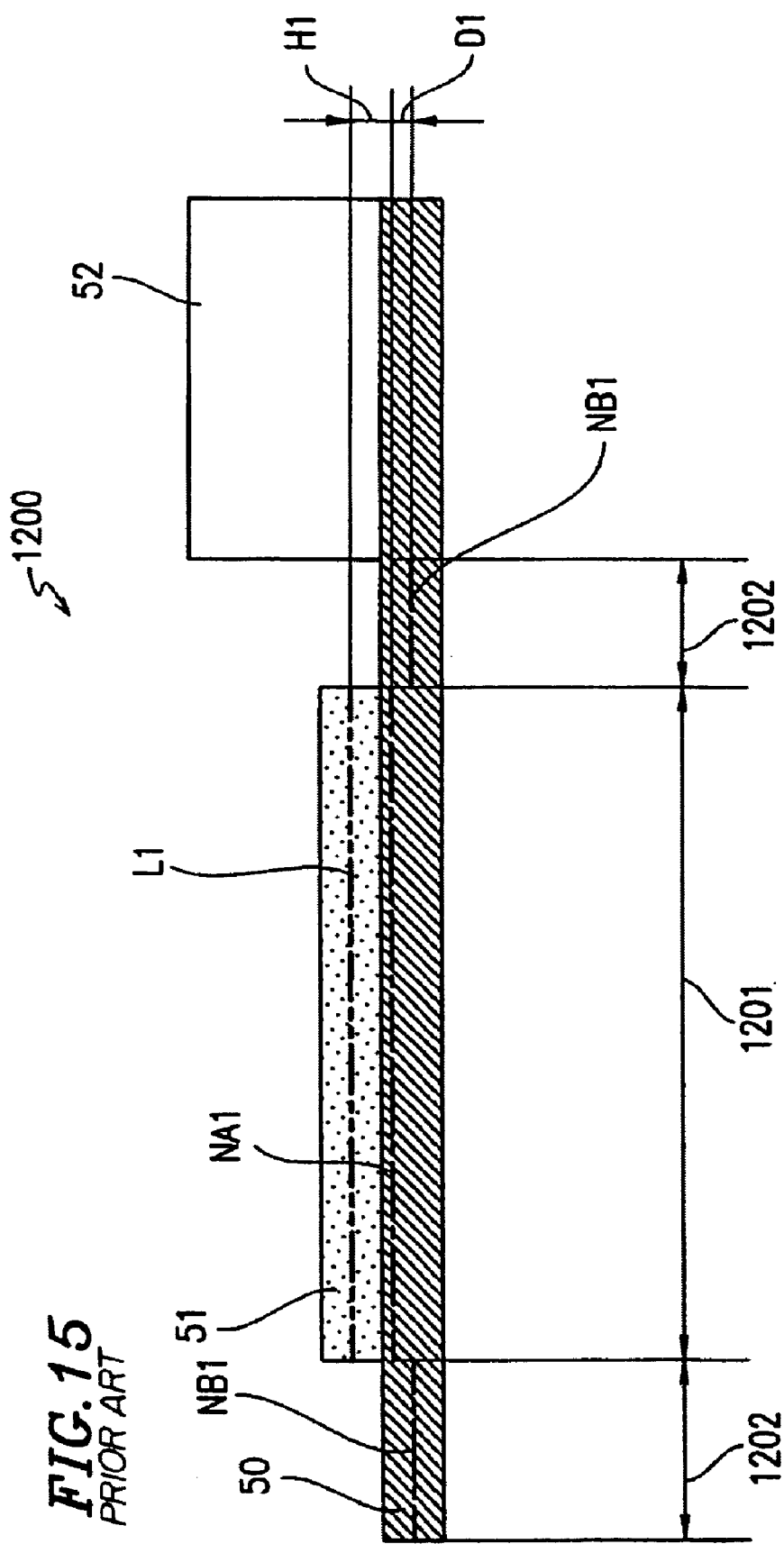
FIG. 15 is a cross-sectional view of a conventional head actuator.

As described above with reference to FIG. 15, the conventional head actuator 1200 merely has the displacement element 51 bonded on a part of the surface of the head supporting member 50. Therefore, the neutral face NB1 and the central face L1 are inevitably on the opposite sides with respect to the neutral face NA1. Thus, the displacement addition condition is not fulfilled. By contrast, in the first example of the present invention, the reinforcing plate 32 is bonded to the pivoting portion 31E in the area 302, so that the neutral face NB2 is on the same side as the central face L2 with respect to the neutral face NA2 and thus the displacement addition condition is fulfilled.

Figure 16:
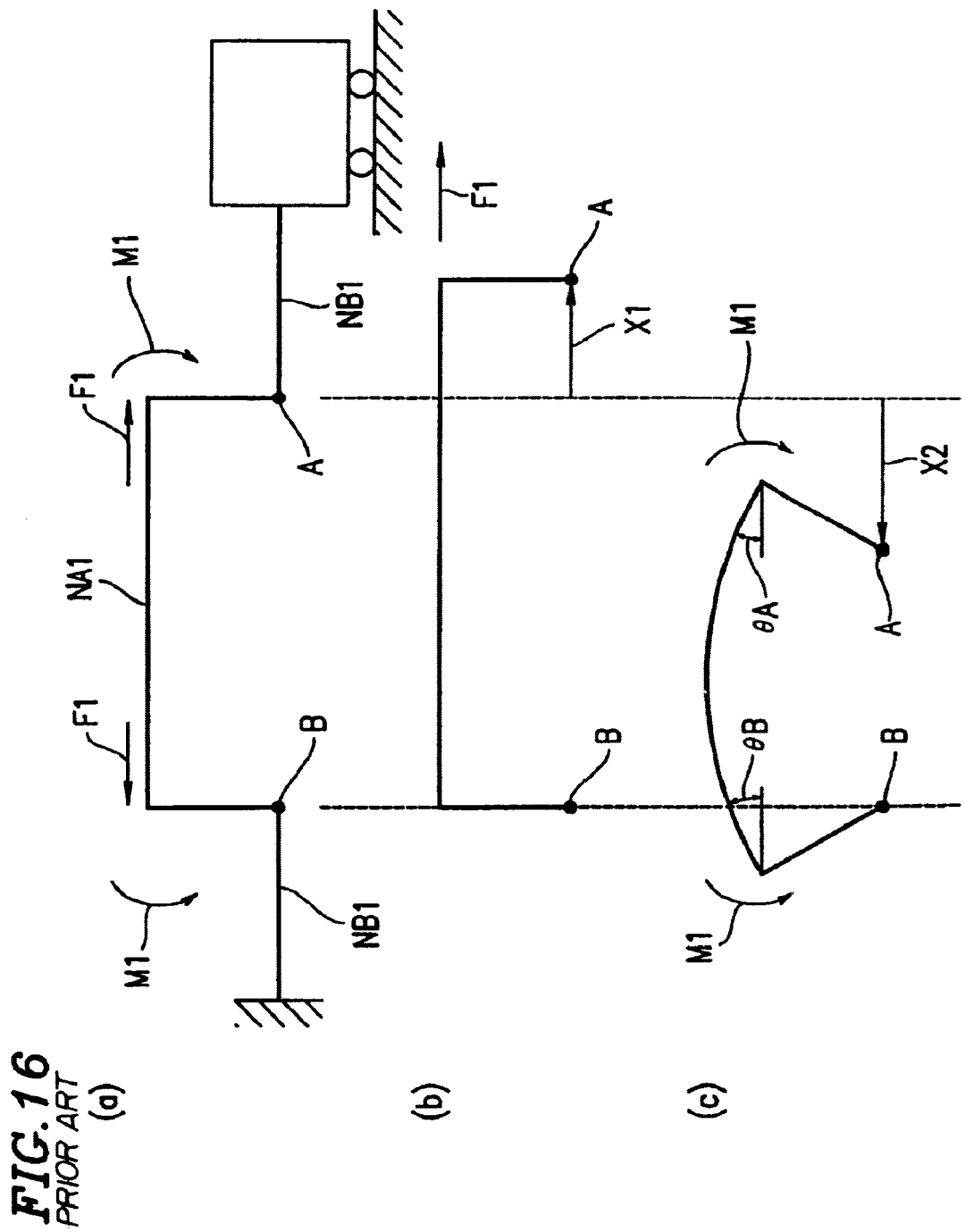
FIG. 16 shows a static model of the conventional head actuator shown in FIG. 15.

The conventional head actuator 1200 has the following problem described above with reference to FIG. 16. The displacement amount X1 generated in one longitudinal direction by the expanding force F1 is partially lost by the displacement amount X2 in the opposite longitudinal direction generated by the flexure angle θA, and as a result, a sufficient amount of displacement to position the magnetic head is not provided. The first example according to the present invention solves the problem as described above with reference to FIG. 5. The displacement amount X3 generated in one longitudinal direction by the expanding force F2 is added together with the displacement amount X4 generated in the same longitudinal direction by the flexure angle θ2, and as a result, the actual displacement amount is increased.

EXAMPLE 2

A head actuator according to a second example of the present invention will be described with reference to FIGS. 6 through 8.

Figure 6:
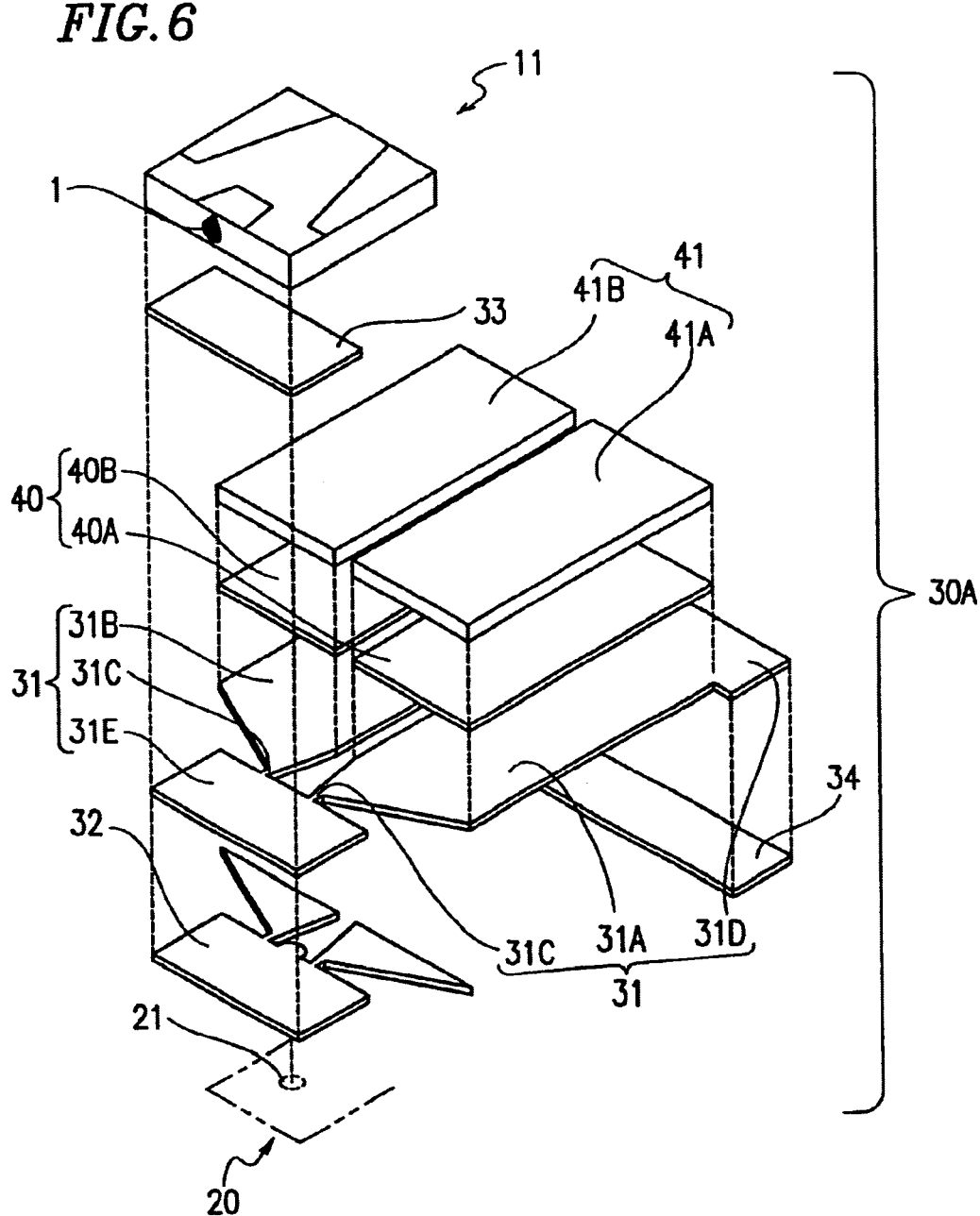
FIG. 6 is a partial exploded isometric view of a head actuator according to a second example of the present invention.

FIG. 6 is a partial exploded isometric view of the head actuator according to the second example. FIG. 7 is a schematic cross-sectional view of a flexure member 30A shown in FIG. 6. In FIG. 7, the flexure member 30A is shown with a size in thickness directions being enlarged with respect to a size in longitudinal directions of the flexure member 30A. Identical and corresponding elements previously discussed with respect to FIGS. 1 through 5 bear identical reference numerals and the detailed descriptions thereof will be omitted.

Figure 7:
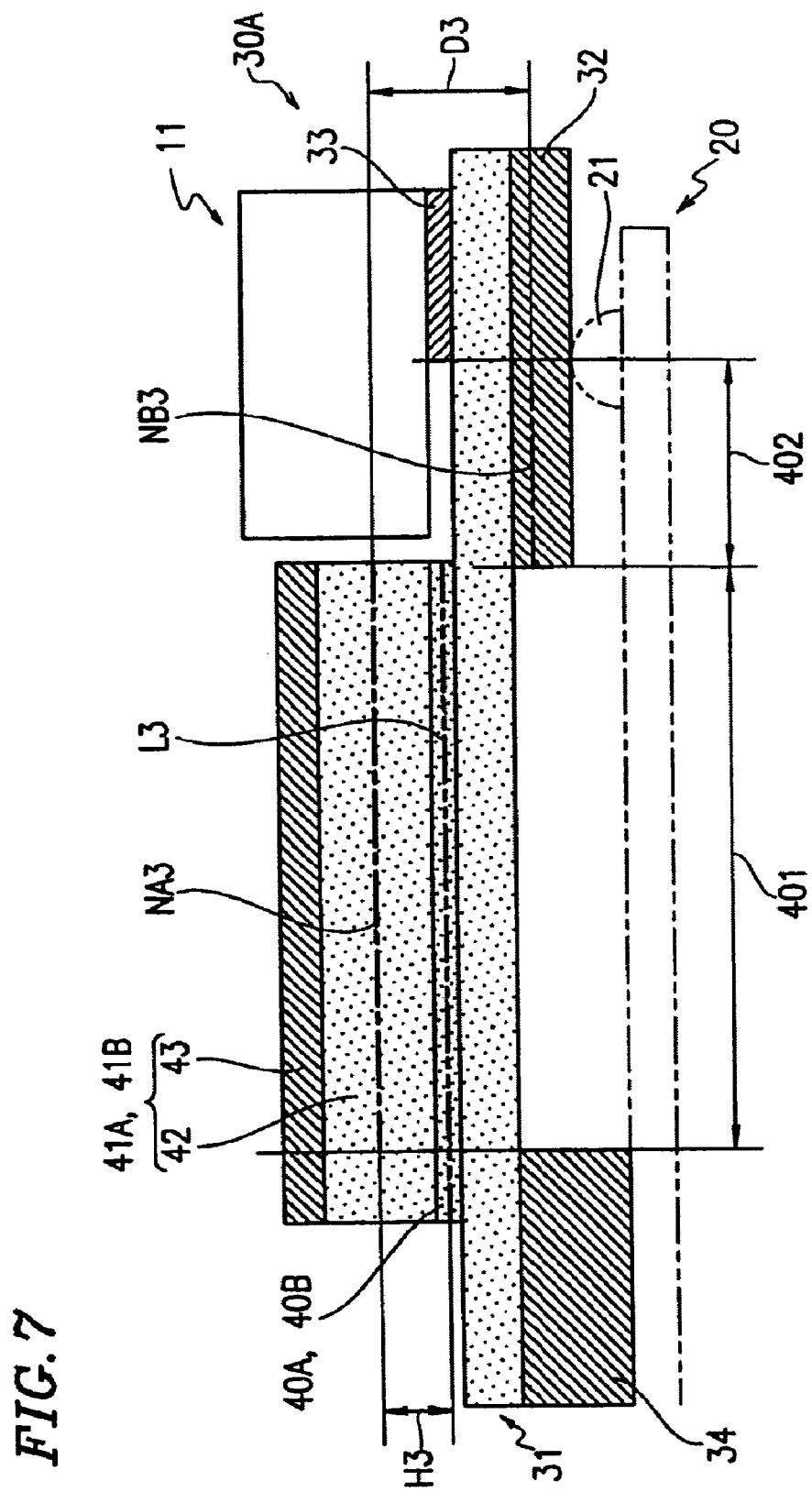
FIG. 7 is a cross-sectional view of a flexure member of the head actuator in the second example.

As shown in FIGS. 6 and 7, the flexure member 30A in the second example is different from the flexure member 30 mainly in the following three points.

(1) The piezoelectric element unit 40 is not overlapped with a head slider 11 in thickness directions as shown in FIG. 7 in the second example, whereas the piezoelectric element unit 40 is partially overlapped with the head slider 11 in the thickness directions as shown in FIG. 3 in the first example.

(2) The reinforcing plate 32 is bonded to the flexible substrate 31 on a surface which is on the opposite side to a surface on which the piezoelectric element unit 40 is provided as shown in FIG. 7 in the second example, whereas the reinforcing plate 32 is bonded to the flexible substrate 31 on a surface which is on the same side as the surface on which the piezoelectric element unit 40 is provided as shown in FIG. 3 in the first example.

(3) A holding member 41 is bonded to the piezoelectric element unit 40 as shown in FIG. 7 in the second example. In more detail, holding members 41A and 41B of the holding member 41 are respectively bonded to the piezoelectric element units 40A and 40B as shown in FIG. 7 in the second example. The holding members 41A and 41B are each formed of a low rigidity polyimide resin layer 42 having a thickness of about 150 μm and a high rigidity stainless steel layer 43 having a thickness of about 10 μm.

In FIG. 3, an area of the flexible substrate 31 including expandable portions 31A and 31B (FIG. 6) is defined as an area 401, and an area including hinge portions 31C (FIG. 6) is defined as an area 402. The holding member 41 is provided on the piezoelectric element unit 40 as described above. The material and the thickness of each of the low rigidity layer 42 and the high rigidity layer 43 are set so that a neutral face NA3 of the area 401 is inside the low rigidity layer 42. A neutral face NB3 of the area 402 is inside the reinforcing plate 32. A neutral face step D3 is about 103 μm. A distance H3 between a central face L3 of the piezoelectric element unit 40 and the neutral face NA3 is about 78 μm. As described above, in the second example, the neutral face NB3 of the area 402 and the central face L3 of the piezoelectric element unit 40 are on the same side with respect to the neutral face NA3 of the area 401. Thus, the displacement addition condition described in the first example is fulfilled.

Figure 8:
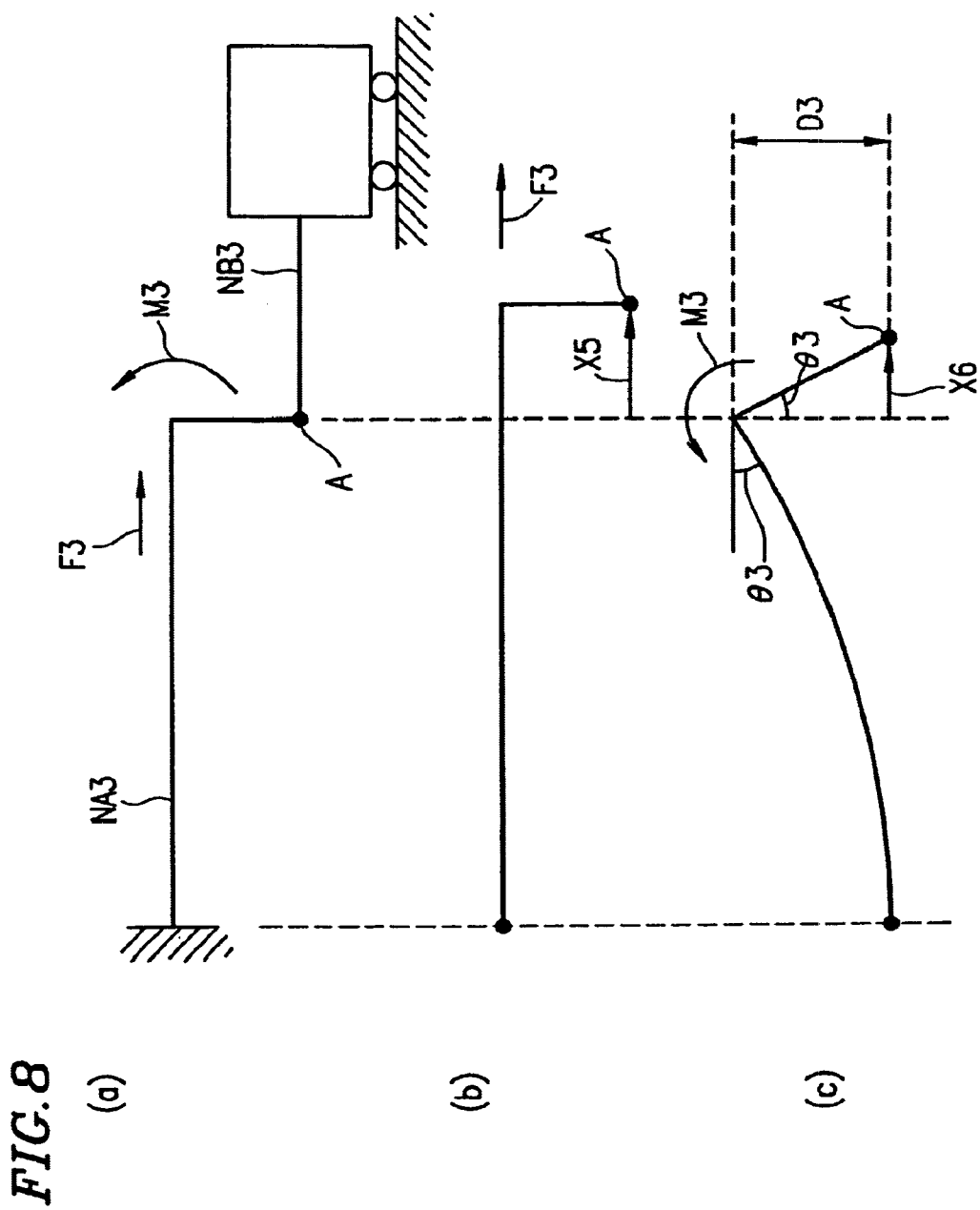
FIG. 8 shows a static model of the head actuator In the second example.

FIG. 8 shows a static model of the head actuator according to the second example. Comparing the static model shown in FIG. 5 and the static model shown in FIG. 8, the models are mirror images with respect to the up-and-down directions of the sheets of FIGS. 5 and 8. Accordingly, a displacement amount X5 generated by an expanding force F3 and a displacement amount X6 generated by a flexure angle θ3 are in the same direction by a function similar to that described in the first example. Thus, a sum of the displacement amounts X5 and X6 is the actual displacement amount.

Namely, the displacement amount X5 generated in one longitudinal direction by the expanding force F3 is added together with the displacement amount X6 generated in the same longitudinal direction by the flexure angle θ3, and as a result, the actual displacement amount is increased.

In the second example, the neutral face step D3 can be larger than the neutral face step D2 (FIG. 3) in the first example. Therefore, the flexure angle can be converted into a larger displacement amount in the longitudinal directions. Despite a slight reduction in the expanding or contracting amount in the longitudinal directions due to the provision of the holding members 41A and 41B, the actual displacement amount is larger than that in the first example owing to the conversion of the flexure angle into a larger displacement amount in the longitudinal directions.

Regarding a kinetic characteristic of the flexure 30A, the holding members 41A and 41B act to improve the flexure rigidity of the flexure member 30A. Therefore, the natural frequency, i.e., the mechanical resonance frequency of the head actuator can be improved, and thus the head positioning control can be performed in a wider band range.

The holding members 41A and 41B each include the high rigidity layer 43 having a substantially equal rigidity to that of the piezoelectric element units 40A and 40B and the low rigidity layer 42 having a sufficiently lower rigidity than that of the high rigidity layer 43. The high rigidity layer 43 is bonded to the piezoelectric element units 40A and 40B with the low rigidity layer 42 being interposed therebetween. Due to such a structure, the thickness of an element for realizing a prescribed neutral face step can be relatively smaller. Since the elongation rigidity in the flexure directions can be increased without excessively increasing the elongation rigidity in the longitudinal directions, the displacement amount and the mechanical resonance frequency can be further increased.

EXAMPLE 3

A head actuator according to a third example of the present invention will be described with reference to FIGS. 9, 10, 11A and 11B.

FIG. 9 is a schematic cross-sectional view of a flexure member 30B in the head actuator according to the third example. In FIG. 9, the flexure member 30B is shown with a size in thickness directions being enlarged with respect to a size in longitudinal directions of the flexure member 30A. The flexure member 30B in the third example is mainly different from the flexure member 30 in the first example in including an intermediate layer 44 as shown in FIG. 9. Identical and corresponding elements previously discussed with respect to FIGS. 1 through 5 bear identical reference numerals and the detailed descriptions thereof will be omitted.

Referring to FIG. 9, the piezoelectric element unit 40 is bonded to the flexible substrate 31 with the intermediate layer 44 being interposed therebetween. The intermediate layer 44 is formed of a polyimide resin and has a thickness of about 18 $\mu$m.

In FIG. 9, an area of the flexible substrate 31 including expandable portions 31A and 31B (FIG. 2) is defined as an area 501, and an area including hinge portions 31C (FIG. 2) is defined as an area 502. The thickness of the intermediate layer 44 is selected so that a neutral face NA4 of the area 501 is continuous to a neutral face NB4 of the area 502.

Figure 17:
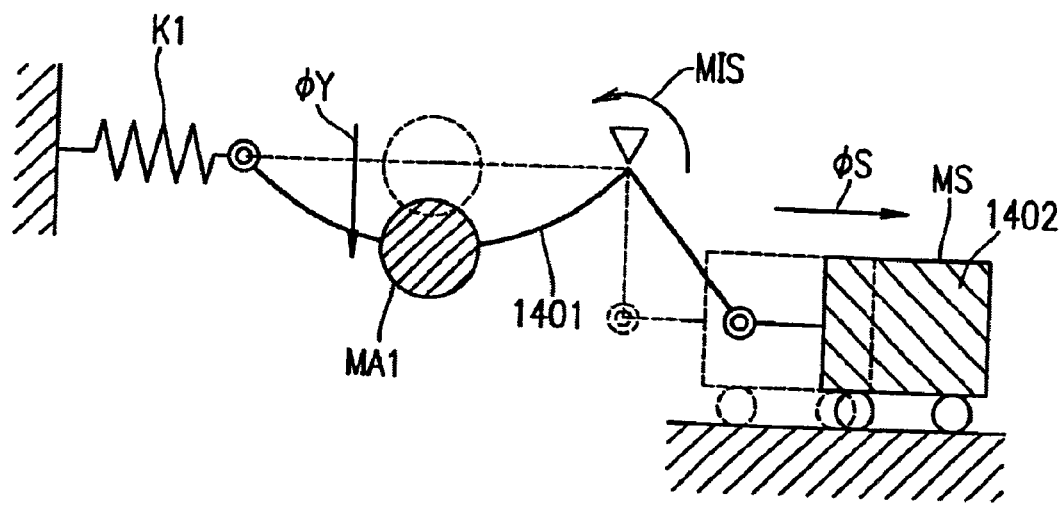
FIG. 17 shows a kinetic model of the conventional head actuator shown in FIG. 15.

The head actuator in the third example significantly increases the mechanical resonance frequency due to the above-described structure. As described above with reference to FIG. 17, in the case of the conventional head actuator 1200, the natural vibration mode is formed in the state where the inertial force generated by the vibration of a head slider 52 having a large mass is balanced with an elastic force of the head supporting member 50 in the bending direction, and the lowest possible mechanical resonance frequency is determined by the natural vibration mode. With the conventional head actuator 1200, since it is difficult to increase the bending rigidity of the head supporting member 50, it is also difficult to increase the mechanical resonance frequency.

In the third example, the neutral face NA4 of the area 501 and the neutral face NB4 of the area 502 are continuous to each other, so that no neutral face step is generated. Due to such a structure, a first natural vibration mode is formed in which a vibration of the flexure member 30B in directions perpendicular to the longitudinal directions, i.e., the flexure directions, does not influence the positioning control of the magnetic head 1 (FIG. 1) provided on the head slider 11. A second natural vibration mode is formed in which the inertial force generated by the vibration of the head slider 11 having a relatively large mass in the longitudinal directions is balanced with an elastic force, in the longitudinal directions, of the flexure member 30B having a relatively high rigidity. In this manner, the mechanical resonance frequency of the head actuator is increased.

Figure 10A:
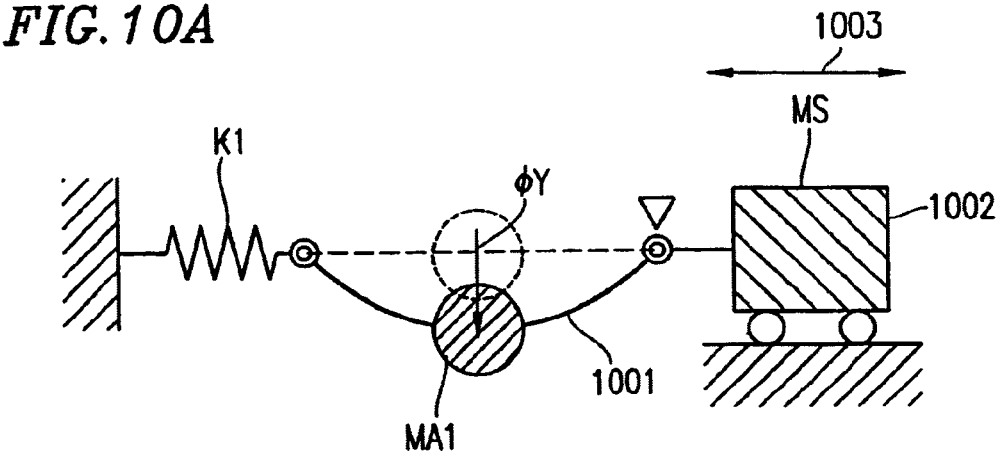
FIGS. 10A and 10B shows a kinetic model of the head actuator in the third example.
Figure 10B:
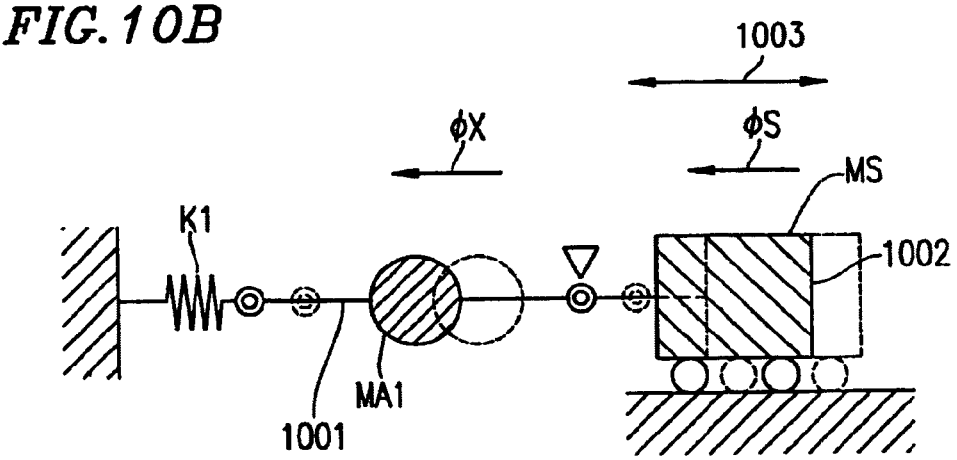

Hereinafter, these two vibration modes will be described with reference to FIGS. 10A and 10B. FIGS. 10A and 10B show a kinetic model of the head actuator in the third example. The flexure member 30B can be represented as a model having an equivalent mass MA1 concentrated at the center of a beam 1001 having an equivalent bending rigidity. In FIGS. 10A and 10B, K1 represents an equivalent rigidity of the flexure element 30B in an expanding or contracting direction thereof, and MS represents an equivalent mass of a movable body 1002 having the head slider 11 at the center.

FIG. 10A shows the model of the flexure member 30B in the first natural vibration mode, in which the flexure member 30B vibrates in directions perpendicular to the longitudinal directions, i.e., the flexure directions. In the third example, the flexure member 30 is structured so as not to have a neutral face step. Therefore, even when the flexure member 30B vibrates in the flexure directions as shown in FIG. 10A, such a vibration does not apply a force to the movable body 1002, having the head slider 11 at the center, in directions shown by a two-headed arrow 1003, unlike the conventional art described with reference to FIG. 17. Thus, the mass MS of the movable body 1002 does not vibrate in the directions shown by the two-headed arrow 1003. Namely, the degree of freedom $\phi$Y of the flexure member 30B in the flexure directions does not influence the degree of freedom $\phi$S of the movable body 1002. Accordingly, even when the first natural vibration mode is generated, the vibration therein is not detected by the magnetic head 1 provided on the head slider 11. The head positioning control is not influenced by the vibration. In the third example, a natural frequency of the first natural vibration mode is 20.7 kHz.

FIG. 10B shows the model of the flexure member 30B in the second natural vibration mode. In the second natural vibration mode, the flexure member 30B and the movable body 1002 integrally vibrate in longitudinal directions of the two-headed arrow 1003. The mass MS of the movable body 1002 is supported by the equivalent rigidity K1 in the longitudinal directions having a higher rigidity than that of the flexure directions, and thus has a relatively high natural frequency. In the third example, the natural frequency of the second natural vibration mode is 22.9 kHz.

Figure 11A:
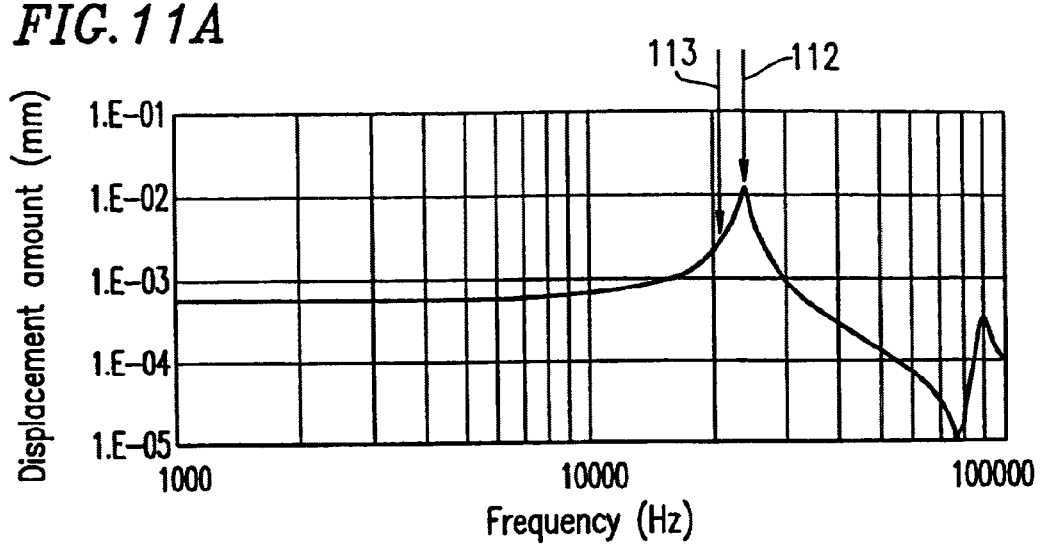
FIGS. 11A and 11B are graphs illustrating dynamic characteristics of a head actuator in the third example and a comparative head actuator.
Figure 11B:
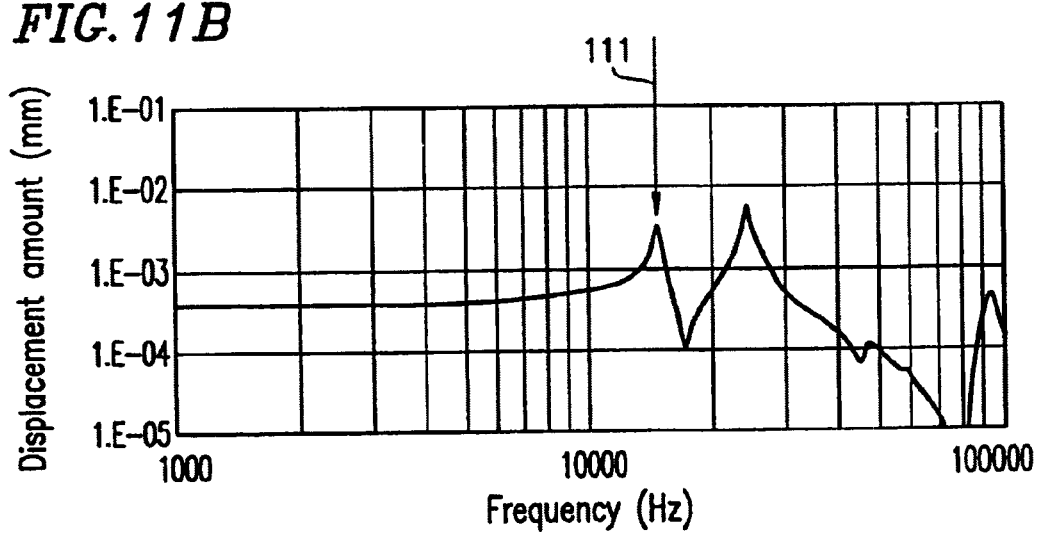

FIGS. 11A and 11B are graphs illustrating dynamic characteristics of a head actuator. In FIGS. 11A and 11B, the horizontal axis represents the frequency of the voltage applied to the head actuator, and the vertical axis represents the displacement amount of the head. FIG. 11A shows the dynamic characteristic in the head actuator in the third example having no neutral face step. For comparison, FIG. 11B shows the dynamic characteristic of a head actuator in which a neutral face step of 16 $\mu$m is generated by increasing the thickness of the intermediate layer. The two head actuators have the same structure except for the thickness of the intermediate layer.

In FIG. 11B, the lowest mechanical resonance frequency is 15.1 kHz (indicated by an arrow 111), which is similar to a value obtained by the natural vibration mode of the kinetic model described above with reference to FIG. 17. By contrast, in FIG. 11A, the lowest mechanical resonance frequency is 22.9 kHz (indicated by an arrow 112), which is a value obtained by the second natural vibration made. The first natural vibration mode exists at a frequency of 20.7 kHz (indicated by an arrow 113), but the vibration is not detected and thus does not influence the head positioning control.

As described above, the head actuator in the third example significantly increases the mechanical resonance frequency by providing the intermediate layer 44 so that the neutral faces of the areas 501 and 502 are continuous to each other. Thus, a higher precision head positioning control is realized in a wider band range.

In the third example, the neutral faces of the areas 501 and 502 are continuous to each other by providing the intermediate layer 44. The present invention is not limited to such a structure. For example, the holding members 41A and 41B described in the second example with reference to FIG. 7 can be provided on the piezoelectric element unit 40 in order to allow the neutral faces of the areas 501 and 502 to be continuous to each other.

Figure 12:
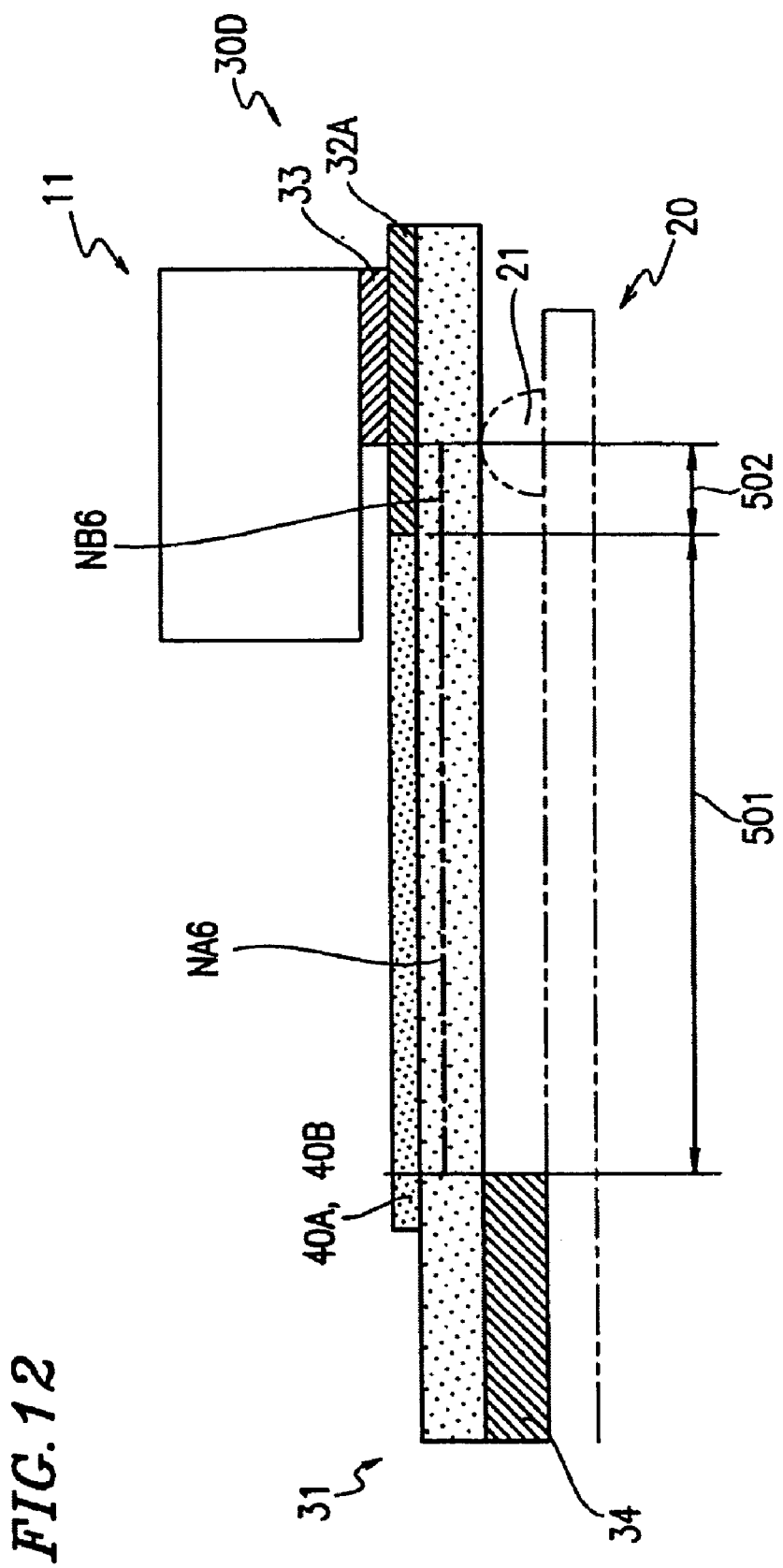
FIG. 12 is a cross-sectional view of a head actuator as a modification of the third example according to the present invention.

FIG. 12 is a partial schematic view of a head actuator as a modification of the third example. In FIG. 12, a reinforcing member 32A is provided in at least the area 502, instead of the intermediate layer 44. By such a structure, a neutral face NA6 of the area 501 and a neutral face NB6 of the area 502 can be continuous to each other.

Figure 13A:
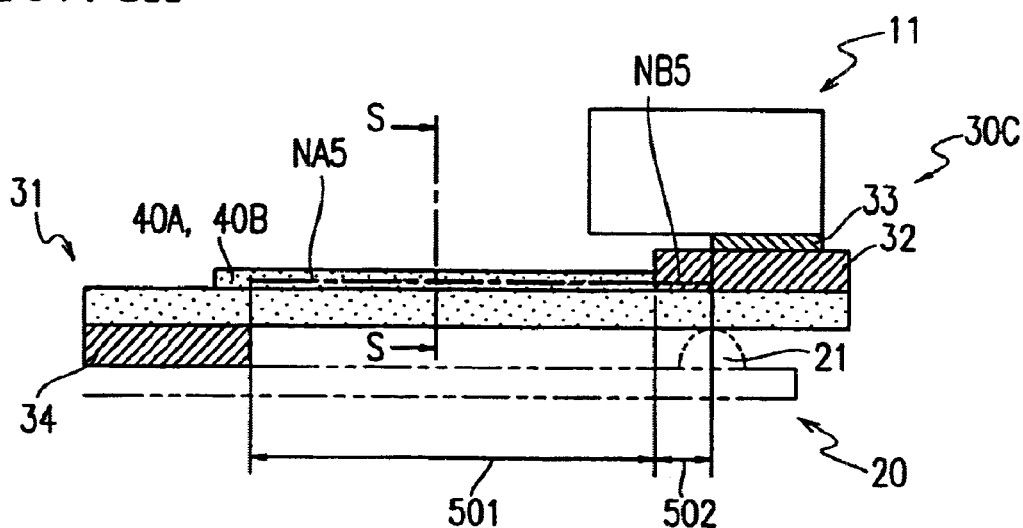
FIG. 13A is a cross-sectional view of a head actuator as another modification of the third example according to the present invention.
Figure 13B:
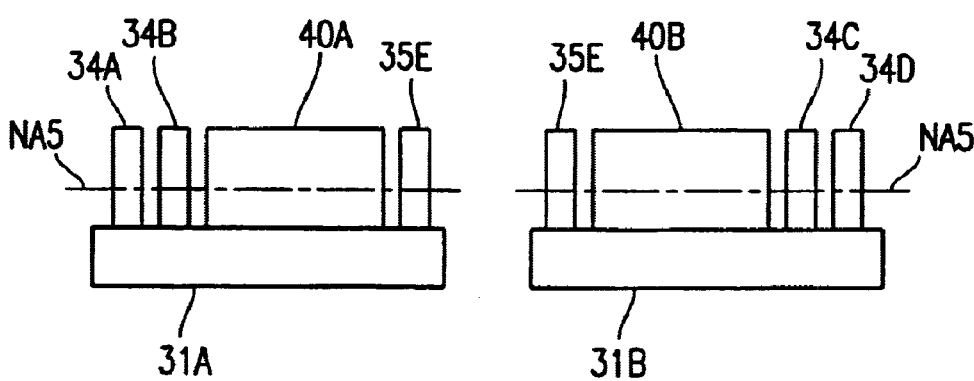
FIG. 13B is a cross-sectional view of FIG. 13A taken along line S—S.

FIG. 13A is a partial schematic cross-sectional view of a head actuator as another modification of the third example. FIG. 13B is a cross-sectional view of FIG. 13A taken along line S—S. FIG. 13B is also a cross-sectional view of FIG. 4 taken along line J—J. As shown in FIG. 13B, lines 34A, 34B, 34C, 34D and 34E having substantially the same thickness as that of the piezoelectric element units 40A and 40B are provided in the vicinity of the piezoelectric element units 40A and 40B. The piezoelectric element units 40A and 40B are respectively provided on the expandable portions 31A and 31B of the flexible substrate 31. Due to such a structure, a neutral face NA5 of the area 501 is moved closer to the piezoelectric element units 40A and 40B so as to be continuous to a neutral face NB5 of the area 502. In this manner, the neutral face NA5 of the area 501 and the neutral face NB5 of the area 502 can be continuous to each other by providing the lines around the piezoelectric element units 40A and 40B. In this case, it is not necessary to provide the intermediate layer 44. The mechanical resonance frequency can be significantly increased, and thus a higher precision head positioning control is realized in a wider band range.

The neutral face NA5 of the area 501 and the neutral face NB5 of the area 502 do not need to be strictly continuous to each other. So long as the neutral face step between the neutral faces NA5 and NB5 is sufficiently small compared to the distance between the neutral face NA5 and a central face of the piezoelectric element unit 40, an effect is provided equivalent to the effect which is provided when the neutral faces NA5 and NB5 are continuous to each other. In such a case, the neutral faces NA5 and NB5 are regarded as being continuous to each other.

In the first through third examples, the piezoelectric element unit is provided on the flexible substrate on the same side as the head slider. Alternatively, the piezoelectric element unit can be provided on the opposite aide to the head slider. The piezoelectric element unit can also be provided on each of the two surfaces of the flexible substrate.

In the first through third examples, the piezoelectric element unit is formed of a single layer, but can be formed of a plurality of piezoelectric elements stacked sequentially.

In the first through third examples, the head slider provided with a magnetic head is mounted on the head actuator. The present invention is applicable to a head actuator mounting an optical pickup.

Figure 14:
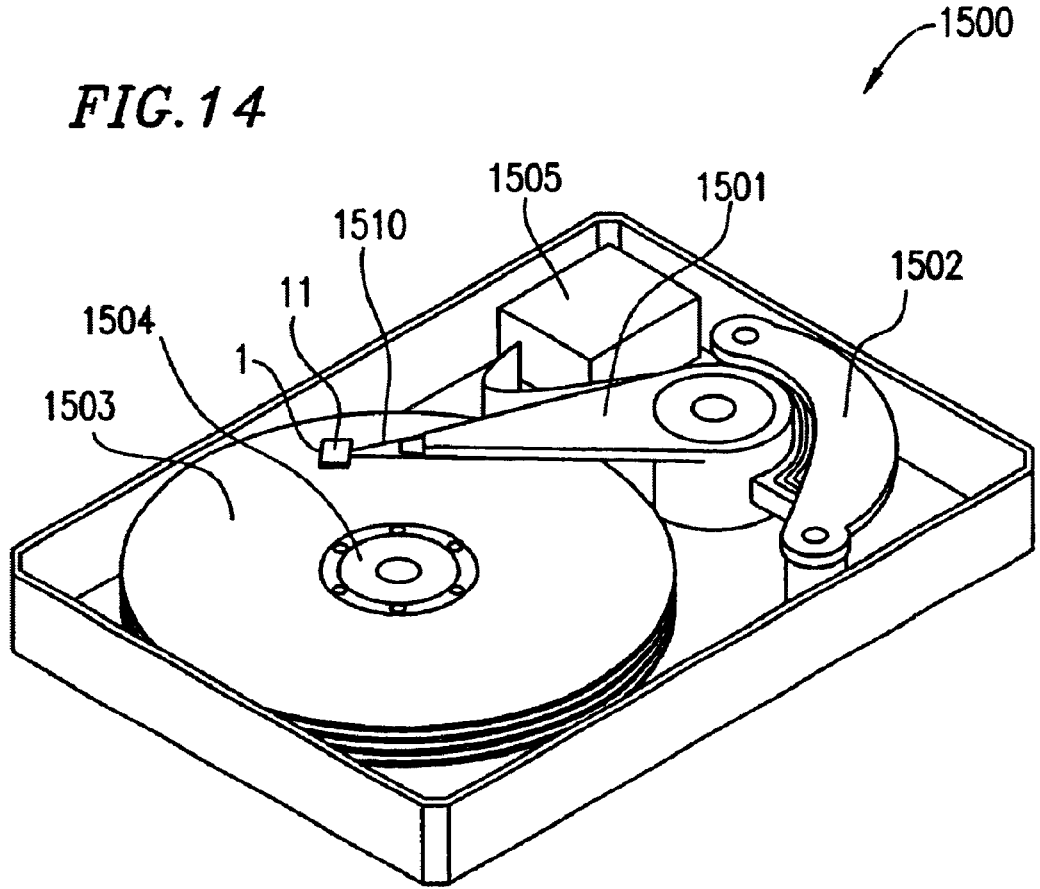
FIG. 14 is an isometric view of a hard disc drive including a head actuator according to the present invention.

FIG. 14 is an isometric view of a hard disc drive 1500 mounting one of the above-described head actuators in the first through third examples.

The hard disc drive 1500 includes a head actuator 1510 including a head slider 11 provided with a magnetic head 1, a head carriage 1501 for carrying the head actuator 1510, a linear or rotational voice coil motor 1502 for moving the magnetic head 1 via the head actuator 1510, a spindle motor 1504 for rotating a disc 1503, and a control section 1505 for supplying a piezoelectric element unit included in the head actuator 1510 with a signal so as to expand or contract a flexible substrate of the head actuator 1510 and thus position the magnetic head 1 in a radial direction of the disc 1503.

The spindle motor 1504 rotates the disc 1503 at a prescribed speed. The voice coil motor 1502 moves the head actuator 1510 including the head slider 11 provided with the magnetic head 1 across a surface of the disc 1503 in a radial direction of the disc 1503, so that the magnetic head 1 can access a prescribed data track on the disc 1503. The piezoelectric element unit expands or contracts the flexible substrate in accordance with the signal supplied by the control section 1505, and thus positions the magnetic head 1 in a radial direction of the disc 1503. The head 1 then records information to or reproduces information from the disc 1503.

The head slider 11 for carrying the magnetic head 1 is, for example, an air bearing slider. In this case, the head slider 11 contacts the surface of the disc 1503 when the hard disc drive 1500 starts and stops operating. During the recording or reproduction of the hard disc drive 1500, the head slider 11 is held above the disc 1503 by the air bearing formed between the disc 1503 and the head slider 11.

As described above, a head actuator according to the present invention provides a larger displacement amount of the head at a lower voltage. The mechanical resonance frequency is also increased, and thus a higher precision head positioning control is realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A head actuator, comprising:
   a head slider for carrying a head for recording information to or reproducing information from a recording medium; and
   a head supporting member for supporting the head slider, wherein:
   the head supporting member includes a substrate and a driving element provided on at least one surface of the substrate for generating an expanding and contracting force in a longitudinal direction in accordance with an external signal, wherein the external signal is applied to the driving element so as to expand or contract the head supporting member in the longitudinal direction and to position the head in a radial direction of the recording medium,
   the head supporting member includes a first area on which the head slider is provided, a second area on which the driving element is provided, and a third area for connecting the first area and the second area,
   the driving element has a geometrically central face,
   the head supporting member has a first neutral face in the second area and a second neutral face in the third area, and
   the second neutral face is on the same side as the geometrically central face with respect to the first neutral face.

2. A head actuator according to claim 1, wherein the first neutral face is closer to the substrate than the geometrically central face.

3. A head actuator according to claim 2, wherein the head supporting member further includes a neutral face displacing section for displacing the second neutral face so an to be on the same side as the geometrically central face with respect to the first neutral face.

4. A head actuator according to claim 3, wherein the neutral face displacing section includes a reinforcing member provided in at least the third area.

5. A head actuator according to claim 1, wherein the first neutral face is on the opposite side to the substrate with respect to the geometrically central face.

6. A head actuator according to claim 5, wherein the head supporting member further includes a geometrically central face displacing section for displacing the first neutral face so as to be on the opposite side to the substrate with respect to the geometrically central face.

7. A head actuator according to claim 6, wherein:
the geometrically central face displacing section includes a holding member provided on the same side as the substrate with respect to the driving element, and
the holding member has a function of increasing a rigidity of the head supporting member in a flexure direction and increasing a natural frequency of the head supporting member.

8. A head actuator according to claim 7, wherein the holding member includes:
a low rigidity layer provided on the driving element and having a smaller longitudinal elastic coefficient than that of the driving element, and
a high rigidity layer provided on the low rigidity layer and having a larger longitudinal elastic coefficient than that of the low rigidity layer.

9. A head actuator according to claim 8, wherein the low rigidity layer includes a polyimide resin, and the high rigidity layer includes stainless steel.

10. A head actuator according to claim 6, wherein the head supporting member further includes a first neutral face displacing section for displacing the second neutral face so as to be on the same side as the geometrically central face with respect to the first neutral face.

11. A head actuator according to claim 10, wherein the first neutral face displacing section includes a reinforcing member provided in at least the third area.

12. A head actuator according to claim 11, wherein the reinforcing member is provided on the opposite side to the driving element with respect to the substrate.

13. A head actuator according to claim 1, wherein:
the driving element has a first elongation rigidity,
the substrate has a second elongation rigidity, and
the first elongation rigidity is larger than the second elongation rigidity.

14. A head actuator according to claim 1, wherein the driving element has a plate-like shape.

15. A head actuator according to claim 1, wherein the driving element includes a piezoelectric element unit including a thin film piezoelectric body and an electrode provided on the thin film piezoelectric body.

16. A head actuator according to claim 1, wherein the driving element includes a first driving element and a second driving element which are supplied with voltages in opposite directions to each other.

17. A head actuator according to claim 16, wherein the substrate includes:
a first expansion and contraction section having the first driving element provided thereon,
a second expansion and contraction section having the second driving element provided thereon,
a pivoting section having the head slider provided thereon,
a first hinge section for connecting the pivoting section and the first expansion and contraction section, and
a second hinge section for connecting the pivoting section and the second expansion and contraction section.

18. A head actuator according to claim 1, wherein the head actuator further includes a load beam for supporting the head supporting member.

19. A head actuator, comprising:
a head slider for carrying a head for recording information to or reproducing information from a recording medium; and
a head supporting member for supporting the head slider, wherein:
the head supporting member includes a substrate and a driving element provided on at least one surface of the substrate for generating an expanding and contracting force in a longitudinal direction in accordance with an external signal, wherein the external signal is applied to the driving element so as to expand or contract the head supporting member in the longitudinal direction and to position the head in a radial direction of the recording medium,
the head supporting member includes a first area on which the head slider is provided, a second area on which the driving element is provided, and a third area for connecting the first area and the second area,
the head supporting member has a first neutral face in the second area and a second neutral face in the third area, and
the first neutral face and the second neutral face are substantially continuous to each other.

20. A head actuator according to claim 19, wherein the head supporting member includes a continuation section for causing the first neutral face and the second neutral face to be substantially continuous to each other.

21. A head actuator according to claim 20, wherein the continuation section includes an intermediate layer provided between the substrate and the driving element.

22. A head actuator according to claim 20, wherein the continuation section includes a reinforcing member provided in at least the third area.

23. A head actuator according to claim 20, wherein the continuation section includes a line section provided in the vicinity of the driving element.

24. A head actuator according to claim 19, wherein:
the driving element has a first elongation rigidity,
the substrate has a second elongation rigidity, and
the first elongation rigidity is larger than the second elongation rigidity.

25. A head actuator according to claim 19, wherein the driving element has a plate-like shape.

26. A head actuator according to claim 19, wherein the driving element includes a piezoelectric element unit including a thin film piezoelectric body and an electrode provided on the thin film piezoelectric body.

27. A head actuator according to claim 19, wherein the driving element includes a first driving element and a second driving element which are supplied with voltages in opposite directions to each other.

28. A head actuator according to claim 27, wherein the substrate includes:
a first expansion and contraction section having the first driving element provided thereon,
a second expansion and contraction section having the second driving element provided thereon,
a pivoting section having the head slider provided thereon,
a first hinge section for connecting the pivoting section and the first expansion and contraction section, and
a second hinge section for connecting the pivoting section and the second expansion and contraction section.

29. A head actuator according to claim 19, wherein the head actuator further includes a load beam for supporting the head supporting member.

30. A hard disc drive, comprising:
a head actuator according to claim 1;

a motor for rotating the recording medium;

a driving section for moving the head actuator across a surface of the recording medium in a radial direction of the recording medium so as to allow the head to access a prescribed data track on the recording medium; and a control section for supplying the driving element with an external signal so as to expand or contract the head supporting member in a longitudinal direction and position the head in the radial direction of the recording medium.

31. A hard disc drive, comprising:

a head actuator according to claim 19;

a motor for rotating the recording medium;

a driving section for moving the head actuator across a surface of the recording medium in a radial direction of the recording medium so as to allow the head to access a prescribed data track on the recording medium; and a control section for supplying the driving element with an external signal so as to expand or contract the head supporting member in a longitudinal direction and position the head in the radial direction of the recording medium.

* * * * *